United States Patent
Yu et al.

(10) Patent No.: US 10,993,258 B2
(45) Date of Patent: *Apr. 27, 2021

(54) RANDOM ACCESS RESPONSE INFORMATION TRANSMISSION METHOD, BASE STATION, AND USER EQUIPMENT

(71) Applicant: HUAWEI TECHNOLOGIES CO.,LTD., Guangdong (CN)

(72) Inventors: Zheng Yu, Beijing (CN); Xiangdong Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,385

(22) Filed: Jun. 24, 2020

(65) Prior Publication Data
US 2020/0329492 A1 Oct. 15, 2020

Related U.S. Application Data

(63) Continuation of application No. 15/895,793, filed on Feb. 13, 2018, now Pat. No. 10,873,971, which is a
(Continued)

(51) Int. Cl.
*H04W 74/08* (2009.01)
*H04W 74/00* (2009.01)
*H04W 56/00* (2009.01)

(52) U.S. Cl.
CPC ..... *H04W 74/006* (2013.01); *H04W 56/0045* (2013.01); *H04W 74/008* (2013.01);
(Continued)

(58) Field of Classification Search
CPC ............. H04W 74/008; H04W 74/006; H04W 74/0833; H04W 74/0858
See application file for complete search history.

(56) References Cited

U.S. PATENT DOCUMENTS 8,391,129 B2  3/2013 Dinan
2009/0316638 A1* 12/2009 Yi .................... H04W 24/08
370/329
(Continued)

FOREIGN PATENT DOCUMENTS

CN   101102605 A   1/2008
CN   101674661 A   3/2010
(Continued)

OTHER PUBLICATIONS

3GPP TS 36.213 V12.6.0 (Jun. 2015);3rd Generation Partnership Project;Technical Specification Group Radio Access Network;Evolved Universal Terrestrial Radio Access (E-UTRA);Physical layer procedures(Release 12),total 241 pages.
(Continued)

*Primary Examiner* — Hoon J Chung
(74) *Attorney, Agent, or Firm* — Gregg L. Jansen

(57) ABSTRACT

The present disclosure provides an information transmission method, a base station, and user equipment. The method includes: receiving a random access preamble sent by user equipment (UE); generating first information according to the received random access preamble, where the first information is random access response information, and the first information includes at least one of the following information: narrowband indication information used for transmission of a control channel, initialization parameter indication information of a demodulation reference signal scrambling sequence initialization parameter used for transmission of the control channel, coverage enhancement level indication information used for transmission of the control channel, or resource allocation information used for transmission of second information, where the second information is response information to the first information; and sending the first information to the UE.

20 Claims, 6 Drawing Sheets

Related U.S. Application Data continuation of application No. PCT/CN2015/087084, filed on Aug. 14, 2015.

(52) U.S. Cl.
CPC ....... *H04W 74/08* (2013.01); *H04W 74/0858* (2013.01); *H04W 74/0866* (2013.01); *Y02D 30/70* (2020.08)

(56) References Cited

U.S. PATENT DOCUMENTS

| | | |
|---|---|---|
| 2010/0111028 A1 | 5/2010 | Kim et al. |
| 2010/0272035 A1 | 10/2010 | Park et al. |
| 2010/0316016 A1 | 12/2010 | Kim et al. |
| 2010/0323736 A1 | 12/2010 | Fischer et al. |
| 2011/0206000 A1 | 8/2011 | Kwon et al. |
| 2013/0155981 A1 | 6/2013 | Kitazoe |
| 2014/0226601 A1 | 8/2014 | Park et al. |
| 2015/0264718 A1 | 9/2015 | Yu et al. |
| 2017/0055234 A1 | 2/2017 | Seo et al. |
| 2017/0094690 A1 | 3/2017 | Zhang et al. |
| 2018/0077645 A1 | 3/2018 | Yan |

FOREIGN PATENT DOCUMENTS

| | | | |
|---|---|---|---|
| CN | 101779393 | A | 7/2010 |
| CN | 101873713 | A | 10/2010 |
| CN | 103249169 | A | 8/2013 |
| CN | 103841654 | A | 6/2014 |
| JP | 2010524386 | A | 7/2010 |
| KR | 20090081311 | A | 7/2009 |
| WO | 2011120352 | A1 | 10/2011 |
| WO | 2013043008 | A3 | 5/2013 |
| WO | 2014067048 | A1 | 5/2014 |
| WO | 2015116732 | A1 | 8/2015 |
| WO | 2016123429 | A1 | 8/2016 |

OTHER PUBLICATIONS

3GPP TS 36.211 V12.6.0 (Jun. 2015);3rd Generation Partnership Project;Technical Specification Group Radio Access Network;Evolved Universal Terrestrial Radio Access (E-UTRA);Physical channels and modulation(Release 12),total 136 pages.

3GPP TS 36.321 V12.6.0 (Jun. 2015);3rd Generation Partnership Project;Technical Specification Group Radio Access Network;Evolved Universal Terrestrial Radio Access (E-UTRA);Medium Access Control (MAC) protocol specification (Release 12),total 77 pages.

Huawei et al.,"PUSCH for MTC and Coverage Enhancement",3GPP TSG RAN WG1 Meeting #81 R1-152451,May 25-29, 2015,total 4 pages.

Samsung,"RAR/Msg3/Msg4 Transmission for Low Cost UEs",3GPP TSG RAN WG1 #81 R1-152841,May 25 29, 2015,total 3 pages.

ASUSTeK,"Consideration on random access for further MTC enhancement",3GPP TSG-RAN WG2 Meeting #89 R2-150315,Athens, Greece, Feb. 9 13, 2015,total 4 pages.

InterDigital,"Random Access procedure considerations for LC and EC UEs",3GPP TSG-RAN WG2 #90 R2-152619, Fukuoka, Japan May 24 29, 2015,total 5 pages.

R1-140115 Intel Corporation,"Coverage Improvement for PRACH",3GPP TSG RAN WG1 Meeting #76,Prague, Czech Republic, Feb. 10 14, 2014,total 9 pages.

R1-151681 ETRI,"RAR transmission for MTC",3GPP TSG RAN WG1 Meeting #80bis,Belgrade, Serbia, Apr. 20 Apr. 24, 2015,total 3 pages.

R1-151213 Ericsson,"EPDCCH initialization and reconfiguration for MTC",3GPP TSG RAN WG1 Meeting #80bis, Belgrade, Serbia, Apr. 20-24, 2015,total 5 pages.

R1-152998 ETRI,"RAR transmission mechanism for MTC",3GPP TSG RAN WG1 Meeting #81,Fukuoka, Japan, May 25 May 29, 2015,total 3 pages.

R1-152691 Panasonic,"Common control messages for MTC UEs",3GPP TSG RAN WG1 Meeting #81,Fukuoka, Japan, May 25 29, 2015,total 4 pages.

R1-151232 Alcatel-Lucent et al.,"Considerations on Common Control Messages for LC-MTC",3GPP TSG RAN WG1 Meeting #80bis,Belgrade, Serbia, Apr. 20-24, 2015,total 4 pages.

R2-151585 InterDigital,"Random Access procedure considerations for LC and CE UEs",3GPP TSG-RAN WG2 #89bis, Bratislava, Slovakia, Apr. 20 24, 2015,total 4 pages.

R1-134393 LG Electronics,"RACH procedure for coverage enhancement of MTC UEs",3GPP TSG RAN WG1 #74bis, Guangzhou, China,Oct. 7 11, 2013,total 3 pages.

\* cited by examiner

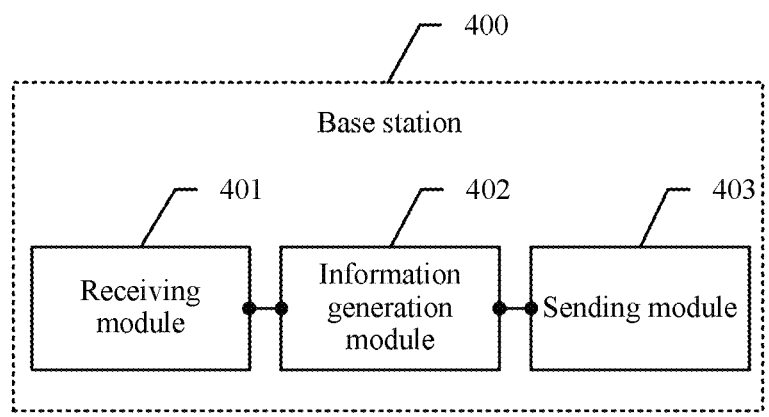
FIG. 4-a
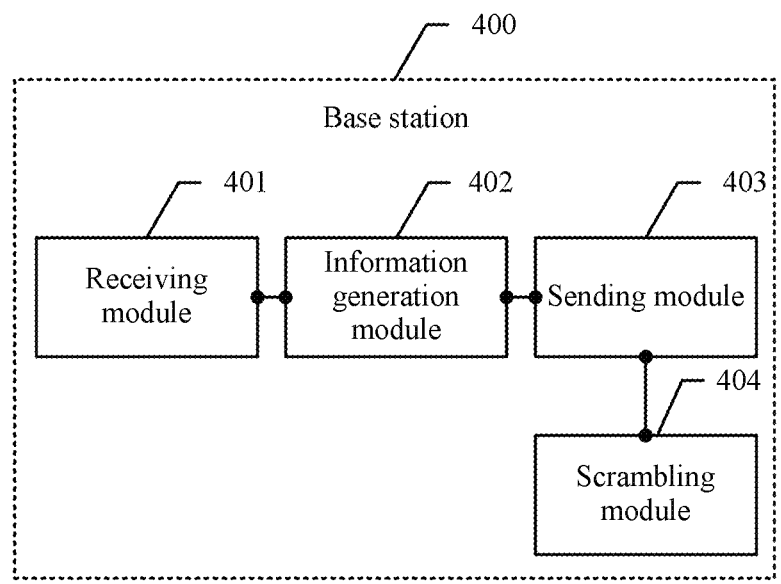
FIG. 4-b

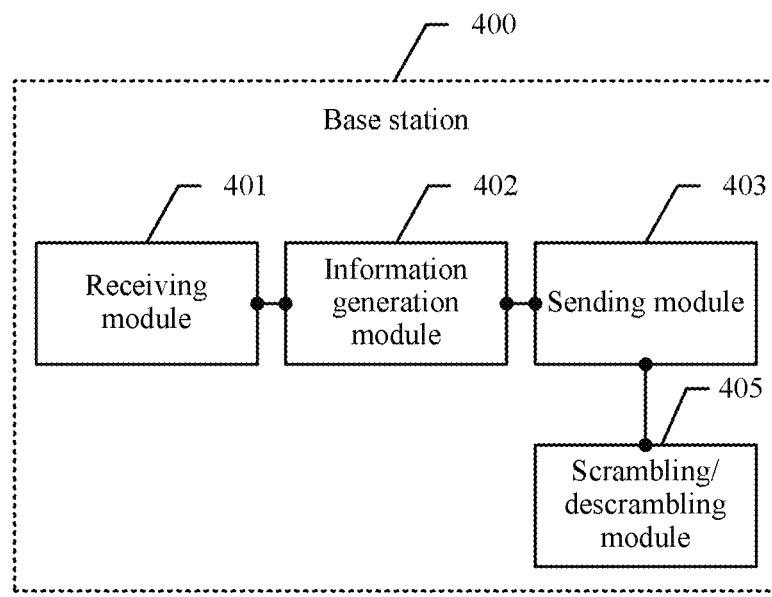
FIG. 4-c
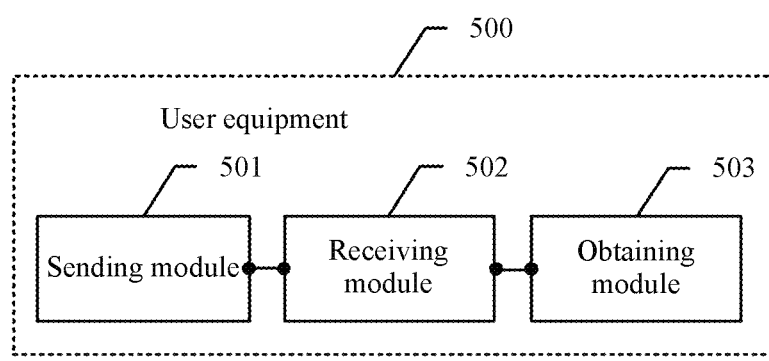
FIG. 5-a

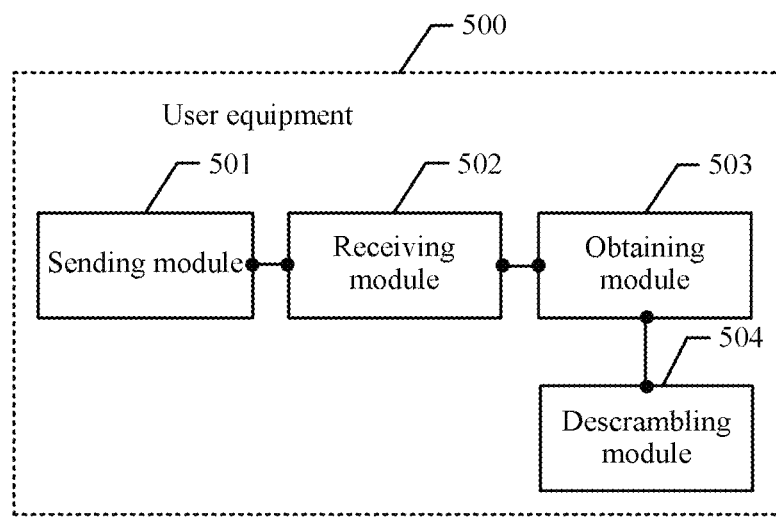
FIG. 5-b
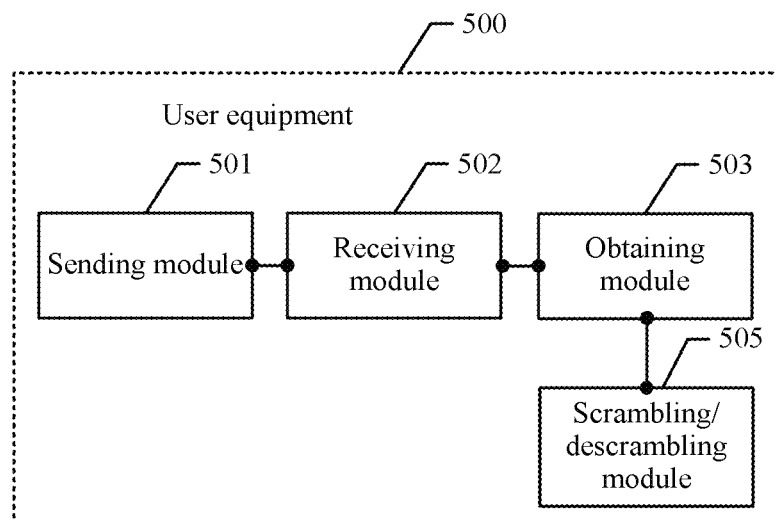
FIG. 5-c

RANDOM ACCESS RESPONSE INFORMATION TRANSMISSION METHOD, BASE STATION, AND USER EQUIPMENT

CROSS-REFERENCE TO RELATED APPLICATIONS

This application is a continuation of U.S. patent application Ser. No. 15/895,793, filed on Feb. 13, 2018, which is a continuation of International Application No. PCT/CN2015/087084, filed on Aug. 14, 2015. All of the afore-mentioned patent applications are hereby incorporated by reference in their entireties.

TECHNICAL FIELD

Embodiments of the present invention relate to the communications field, and in particular, to an information transmission method, a base station, and user equipment.

BACKGROUND

The Internet of Things refers to a network in which information about the physical world is obtained by deploying devices having particular sensing, computing, execution, and communication capabilities, and information transmission, collaboration, and processing are implemented by using a network, so as to implement interconnection between a human and a thing and between things. In short, the Internet of Things is intended to implement interconnection and interoperability between a human and a thing and between things. Possible applications include various aspects such as a smart grid, intelligent agriculture, intelligent transportation, and environment monitoring.

The mobile communications standards organization's 3rd Generation Partnership Project (English full name: 3rd Generation Partnership Project, English acronym: 3GPP) is conducting technology researches and standard optimization work for the Internet of Things. Main research and optimization directions are reduction of costs and coverage enhancement. In terms of reduction of costs or complexity, one or more of a working bandwidth, a processing bandwidth, a radio frequency bandwidth, or a baseband bandwidth of a terminal device may be reduced. Such type of terminal may be referred to as a low-cost terminal or a low-complexity terminal. For example, an important research direction is to limit the working bandwidth of the terminal device to 1.4 MHz. In terms of coverage enhancement, coverage enhancement supporting is mainly provided for a machine type communication (English full name: Machine Type Communication, English acronym: MTC) device with a relatively large path loss and located in a basement or the like, so that the device in a special scenario can access a network and obtain a service. One method for implementing coverage enhancement is signal repetition. A technology of signal repetition can lead to coverage enhancement to some extent, but may consume more resources. How to improve resource utilization when signal repetition is used to implement coverage enhancement is a problem that needs to be resolved.

In terms of a random access response (English full name: Random Access Response, English acronym: RAR), according to a current protocol, a RAR message is transmitted by using a physical downlink shared data channel (English full name: Physical downlink shared data channel, English acronym: PDSCH) scheduled by a physical downlink control channel (English full name: Physical Downlink Control Channel, English acronym: PDCCH). User equipment (English full name: User Equipment, English acronym: UE) needs to receive the PDCCH first, obtains a transport block size (English full name: Transport Block Size, English acronym: TBS) of a random access response message according to an indication of control information in the received PDCCH, and further receives the random access response message according to the determined TBS.

In a scenario in which coverage enhancement transmission needs to be performed on the random access response, because the RAR message in the prior art includes excessive information content, a large quantity of repeats are needed during the coverage enhancement transmission. This greatly increases UE detection complexity and UE power consumption overheads. For example, in the prior art, one RAR message may include one or more RARs. Information content included in one RAR occupies at least 7 bytes (that is, 56 bits), causing excessively heavy load of the RAR message. In a scenario in which coverage enhancement transmission needs to be performed on the RAR message, as an example, the coverage enhancement transmission is repeat transmission, and a quantity of random access opportunities within a same time resource is reduced. If the existing RAR message is still used, resource utilization efficiency of the RAR message is inevitably reduced, and power consumption overheads of channel detection by the user equipment are still very large.

SUMMARY

Embodiments of the present invention provide an information transmission method, a base station, and user equipment, so as to improve resource utilization efficiency in transmission of information about a random access response, and reduce power consumption overheads of channel detection by user equipment.

According to a first aspect, an embodiment of the present invention provides an information transmission method, including:

receiving a random access preamble sent by user equipment UE;

generating first information according to the received random access preamble, where the first information is information about a random access response to the random access preamble, and the first information includes at least one of the following information: timing advance indication information, indication information of a narrowband resource used for transmission of a control channel, indication information of a subframe used for transmission of the control channel, indication information of a demodulation reference signal scrambling sequence initialization parameter used for transmission of the control channel, indication information of a coverage enhancement level used for transmission of the control channel, or resource allocation information used for transmission of second information, where the second information is information about a response to the first information; and sending the first information to the UE.

With reference to the first aspect, in a first possible implementation of the first aspect, the first information further includes at least one of the following information: indication information of a temporary cell-radio network temporary identifier, indication information of the random access preamble, rollback indication information, or indication information of a control channel candidate set of the control channel.

With reference to the first aspect or the first possible implementation of the first aspect, in a second possible implementation of the first aspect, the first information further includes at least one of the following information: frequency hopping indication information of the second information, coverage enhancement transmission indication information of the second information, start offset indication information of a physical uplink control channel resource, or frequency hopping indication information of the control channel.

With reference to the first aspect or the first or the second possible implementation of the first aspect, in a third possible implementation of the first aspect, the first information further includes at least one of the following information: transmit power control indication information used by the UE to send the second information, modulation and coding method indication information used by the UE to send the second information, uplink delay indication information used by the UE to send the second information, indication information indicating whether the UE reports channel state information, start symbol indication information for transmission of a UE-specific message, control channel configuration set identifier indication information of the control channel, or indication information of a transmission type used for transmission of the control channel.

With reference to the first aspect or the first or the second or the third possible implementation of the first aspect, in a fourth possible implementation of the first aspect, the first information further includes: format indication information of the downlink control channel, or format indication information of the downlink data channel.

With reference to the fourth possible implementation of the first aspect, in a fifth possible implementation of the first aspect, the sending the first information to the UE includes:

adding the first information to the downlink control channel, and sending the first information to the UE by using the downlink control channel; or adding the first information to the downlink data channel, and sending the first information to the UE by using the downlink data channel.

With reference to the first aspect or the first or the second or the third or the fourth or the fifth possible implementation of the first aspect, in a sixth possible implementation of the first aspect, before the sending the first information to the UE, the method further includes:

scrambling the first information according to the radio network temporary identifier, where the radio network temporary identifier is determined according to the random access preamble.

With reference to the first aspect or the first or the second or the third or the fourth or the fifth possible implementation of the first aspect, in a seventh possible implementation of the first aspect, after the sending the first information to the UE, the method further includes:

scrambling or descrambling at least one of the second information, the control channel, or the UE-specific information according to the radio network temporary identifier, where the radio network temporary identifier is determined according to the random access preamble.

According to a second aspect, an embodiment of the present invention further provides an information transmission method, including:

sending a random access preamble to a base station;

receiving first information corresponding to the random access preamble, where the first information is information about a random access response of the base station to the random access preamble; and obtaining at least one of the following information from the first information: timing advance indication information, indication information of a narrowband resource used for transmission of a control channel, indication information of a subframe used for transmission of the control channel, indication information of a demodulation reference signal scrambling sequence initialization parameter used for transmission of the control channel, indication information of a coverage enhancement level used for transmission of the control channel, or resource allocation information used for transmission of second information, where the second information is information about a response to the first information.

With reference to the second aspect, in a first possible implementation of the second aspect, the first information further includes at least one of the following information: indication information of a temporary cell-radio network temporary identifier, indication information of the random access preamble, rollback indication information, or indication information of a control channel candidate set of the control channel.

With reference to the second aspect or the first possible implementation of the second aspect, in a second possible implementation of the second aspect, the first information further includes at least one of the following information: frequency hopping indication information of the second information, coverage enhancement transmission indication information of the second information, start offset indication information of a physical uplink control channel resource, or frequency hopping indication information of the control channel.

With reference to the second aspect or the first or the second possible implementation of the second aspect, in a third possible implementation of the second aspect, the first information further includes at least one of the following information: transmit power control indication information used by the UE to send the second information, modulation and coding method indication information used by the UE to send the second information, uplink delay indication information used by the UE to send the second information, indication information indicating whether the UE reports channel state information, start symbol indication information for transmission of a UE-specific message, control channel configuration set identifier indication information of the control channel, or indication information of a transmission type used for transmission of the control channel.

With reference to the second aspect or the first or the second or the third possible implementation of the second aspect, in a fourth possible implementation of the second aspect, the first information further includes: format indication information of the downlink control channel, or format indication information of the downlink data channel.

With reference to the fourth possible implementation of the second aspect, in a fifth possible implementation of the second aspect, the receiving first information corresponding to the random access preamble includes:

receiving the downlink control channel, and obtaining the first information from the downlink control channel; or receiving the downlink data channel, and obtaining the first information from the downlink data channel.

With reference to the second aspect or the first or the second or the third or the fourth or the fifth possible implementation of the second aspect, in a sixth possible implementation of the second aspect, the method further includes:

descrambling the first information according to the radio network temporary identifier, where the radio network temporary identifier is determined according to the random access preamble.

With reference to the second aspect or the first or the second or the third or the fourth or the fifth possible implementation of the first aspect, in a seventh possible implementation of the second aspect, after the receiving first information corresponding to the random access preamble, the method further includes:

performing at least one of the following steps: sending the second information, receiving the control information, or receiving the UE-specific information; and scrambling or descrambling at least one of the second information, the control channel, or the UE-specific information according to the radio network temporary identifier, where the radio network temporary identifier is determined according to the random access preamble.

According to a third aspect, an embodiment of the present invention further provides a base station, including:

a receiving module, configured to receive a random access preamble sent by user equipment UE;

an information generation module, configured to generate first information according to the received random access preamble, where the first information is information about a random access response to the random access preamble, and the first information includes at least one of the following information: timing advance indication information, indication information of a narrowband resource used for transmission of a control channel, indication information of a subframe used for transmission of the control channel, indication information of a demodulation reference signal scrambling sequence initialization parameter used for transmission of the control channel, indication information of a coverage enhancement level used for transmission of the control channel, or resource allocation information used for transmission of second information, where the second information is information about a response to the first information; and a sending module, configured to send the first information to the UE.

With reference to the third aspect, in a first possible implementation of the third aspect, the first information further includes at least one of the following information: indication information of a temporary cell-radio network temporary identifier, indication information of the random access preamble, rollback indication information, or indication information of a control channel candidate set of the control channel.

With reference to the third aspect or the first possible implementation of the third aspect, in a second possible implementation of the third aspect, the first information further includes at least one of the following information: frequency hopping indication information of the second information, coverage enhancement transmission indication information of the second information, start offset indication information of a physical uplink control channel resource, or frequency hopping indication information of the control channel.

With reference to the third aspect or the first or the second possible implementation of the third aspect, in a third possible implementation of the third aspect, the first information further includes at least one of the following information: transmit power control indication information used by the UE to send the second information, modulation and coding method indication information used by the UE to send the second information, uplink delay indication information used by the UE to send the second information, indication information indicating whether the UE reports channel state information, start symbol indication information for transmission of a UE-specific message, control channel configuration set identifier indication information of the control channel, or indication information of a transmission type used for transmission of the control channel.

With reference to the third aspect or the first or the second or the third possible implementation of the third aspect, in a fourth possible implementation of the third aspect, the first information further includes: format indication information of the downlink control channel, or format indication information of the downlink data channel.

With reference to the fourth possible implementation of the third aspect, in a fifth possible implementation of the third aspect, the sending module is specifically configured to: add the first information to the downlink control channel, and send the first information to the UE by using the downlink control channel; or add the first information to the downlink data channel, and send the first information to the UE by using the downlink data channel.

With reference to the third aspect or the first or the second or the third or the fourth or the fifth possible implementation of the third aspect, in a sixth possible implementation of the third aspect, the base station further includes a scrambling module, configured to: before the sending module sends the first information to the UE, scramble the first information according to the radio network temporary identifier, where the radio network temporary identifier is determined according to the random access preamble.

With reference to the third aspect or the first or the second or the third or the fourth or the fifth possible implementation of the third aspect, in a seventh possible implementation of the third aspect, the base station further includes a scrambling/descrambling module, configured to: after the sending module sends the first information to the UE, scramble or descramble at least one of the second information, the control channel, or the UE-specific information according to the radio network temporary identifier, where the radio network temporary identifier is determined according to the random access preamble.

According to a fourth aspect, an embodiment of the present invention further provides user equipment, including:

a sending module, configured to send a random access preamble to a base station;

a receiving module, configured to receive first information corresponding to the random access preamble, where the first information is information about a random access response of the base station to the random access preamble; and an obtaining module, configured to obtain at least one of the following information from the first information: timing advance indication information, indication information of a narrowband resource used for transmission of a control channel, indication information of a subframe used for transmission of the control channel, indication information of a demodulation reference signal scrambling sequence initialization parameter used for transmission of the control channel, indication information of a coverage enhancement level used for transmission of the control channel, or resource allocation information used for transmission of second information, where the second information is information about a response to the first information.

With reference to the fourth aspect, in a first possible implementation of the fourth aspect, the first information further includes at least one of the following information: indication information of a temporary cell-radio network temporary identifier, indication information of the random access preamble, rollback indication information, or indication information of a control channel candidate set of the control channel.

With reference to the fourth aspect or the first possible implementation of the fourth aspect, in a second possible implementation of the fourth aspect, the first information further includes at least one of the following information: frequency hopping indication information of the second information, coverage enhancement transmission indication information of the second information, start offset indication information of a physical uplink control channel resource, or frequency hopping indication information of the control channel.

With reference to the fourth aspect or the first or the second possible implementation of the fourth aspect, in a third possible implementation of the fourth aspect, the first information further includes at least one of the following information: transmit power control indication information used by the UE to send the second information, modulation and coding method indication information used by the UE to send the second information, uplink delay indication information used by the UE to send the second information, indication information indicating whether the UE reports channel state information, start symbol indication information for transmission of a UE-specific message, control channel configuration set identifier indication information of the control channel, or indication information of a transmission type used for transmission of the control channel.

With reference to the fourth aspect or the first or the second or the third possible implementation of the fourth aspect, in a fourth possible implementation of the fourth aspect, the first information further includes: format indication information of the downlink control channel, or format indication information of the downlink data channel.

With reference to the fourth possible implementation of the fourth aspect, in a fifth possible implementation of the fourth aspect, the receiving module is specifically configured to: receive the downlink control channel, and obtain the first information from the downlink control channel; or receive the downlink data channel, and obtain the first information from the downlink data channel.

With reference to the fourth aspect or the first or the second or the third or the fourth or the fifth possible implementation of the fourth aspect, in a sixth possible implementation of the fourth aspect, the user equipment further includes a descrambling module, configured to descramble the first information according to the radio network temporary identifier, where the radio network temporary identifier is determined according to the random access preamble.

With reference to the fourth aspect or the first or the second or the third or the fourth or the fifth possible implementation of the fourth aspect, in a seventh possible implementation of the fourth aspect, the user equipment further includes a scrambling/descrambling module, where the receiving module is further configured to: after receiving the first information corresponding to the random access preamble, perform at least one of the following steps: receiving the control channel, or receiving the UE-specific information;

the sending module is further configured to: after the receiving module receives the first information corresponding to the random access preamble, send the second information; and the scrambling/descrambling module is configured to scramble or descramble at least one of the second information, the control channel, or the UE-specific information according to the radio network temporary identifier, where the radio network temporary identifier is determined according to the random access preamble.

It can be learned from the foregoing technical solutions that, the embodiments of the present invention have the following advantages:

In the embodiments of the present invention, first, the random access preamble sent by the UE is received, and then, the first information is generated according to the received random access preamble. The first information is the information about the random access response to the random access preamble, and the first information includes at least one of the following information: the timing advance indication information, the indication information of the narrowband resource used for transmission of the control channel, the indication information of the subframe used for transmission of the control channel, the indication information of the demodulation reference signal scrambling sequence initialization parameter used for transmission of the control channel, the indication information of the coverage enhancement level used for transmission of the control channel, or the resource allocation information used for transmission of the second information. The second information is the information about the response to the first information. Finally, the first information is sent to the UE. The first information is information about a random access response, and information included in the first information has fewer indicator bits. Therefore, the first information has a more simplified structure, so that access response information can be transmitted by using relatively fewer resources, thereby improving resource utilization efficiency in transmission of information about a random access response, and reducing power consumption overheads of channel detection by user equipment.

BRIEF DESCRIPTION OF DRAWINGS

FIG. 4-*a* is a schematic structural composition diagram of a base station according to an embodiment of the present invention;

FIG. 4-*b* is a schematic structural composition diagram of another base station according to an embodiment of the present invention;

FIG. 4-*c* is a schematic structural composition diagram of another base station according to an embodiment of the present invention;

FIG. 5-*a* is a schematic structural composition diagram of user equipment according to an embodiment of the present invention;

FIG. 5-*b* is a schematic structural composition diagram of another user equipment according to an embodiment of the present invention;

FIG. 5-*c* is a schematic structural composition diagram of another user equipment according to an embodiment of the present invention;

DESCRIPTION OF EMBODIMENTS

Figure 1:
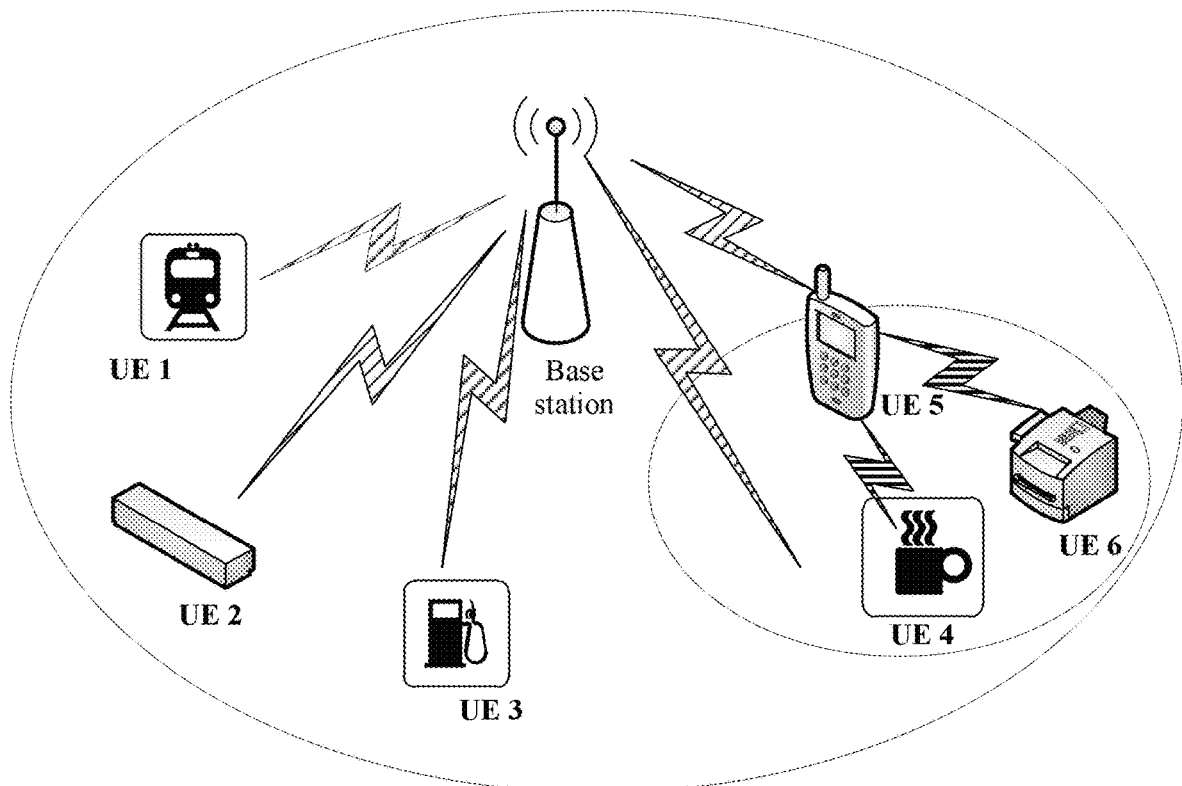
FIG. 1 is a system architecture diagram showing that an information transmission method is applied to a communications system according to the present invention.

Embodiments of the present invention provide an information transmission method, a base station, and user equipment, so as to improve resource utilization efficiency in transmission of information about a random access response, and reduce power consumption overheads of channel detection by user equipment.

To make the invention objectives, features, and advantages of the present invention clearer and more comprehensible, the following clearly and completely describes the technical solutions in the embodiments of the present invention with reference to the accompanying drawings in the embodiments of the present invention. Apparently, the embodiments described in the following are merely some rather than all of the embodiments of the present invention. All other embodiments obtained by persons skilled in the art based on the embodiments of the present invention shall fall within the protection scope of the present invention.

In the specification, claims, and accompanying drawings of the present invention, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present invention. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Transmission in the embodiments of the present invention may be sending or receiving. If transmission by a device on one side is sending, transmission by a communications device on another side corresponding to the device on the side is receiving, and vice versa. Coverage enhancement in the embodiments of the present invention may be one or more of repeat transmission, spread spectrum transmission, retransmission, transmission time interval bundling, narrowband (for example, subcarrier scheduling) transmission, ultra-narrowband (for example, a bandwidth of tens of hertz to ten-odd kilohertz) transmission, add power spectral density transmission, relaxed requirement transmission, or continuous attempt transmission.

First, a system architecture to which the information transmission method of the present invention is applied is briefly described. The present invention is mainly applied to an LTE system or a Long Term Evolution Advanced (LTE-A, LTE Advanced) system. Alternatively, the present invention may be applied to another communications system, for example, a Wideband Code Division Multiple Access (Wideband Code Division Multiple Access, WCDMA) system, or a Time Division-Synchronous Code Division Multiple Access (Time Division-Synchronous Code Division Multiple Access, TD-SCDMA) system, provided that there is an entity in the communications system that can send information, and there is another entity in the communications system that can receive information. For example, the information may be one or more of system information, information about a random access response, or a paging message.

FIG. 1 is a system architecture diagram showing that an information transmission method is applied to a communications system according to the present invention. As shown in FIG. 1, a base station and user equipment (UE) 1 to UE 6 form a communications system. In the communications system, the base station sends one or more of system information, a RAR message, or a paging message to one or more UEs of the UE 1 to the UE 6. The base station is a transmit end device in the information transmission method of the present invention. The UE 1 to the UE 6 are receive end devices in the information transmission method of the present invention. In addition, the UE 4 to the UE 6 also form a communications system. In the communications system, the UE 5 may be implemented as a function of the base station. The UE 5 may send one or more of system information, information about a random access response, or a paging message to one or more UEs of the UE 4 to the UE 6.

The following provides detailed descriptions separately.

Figure 2:
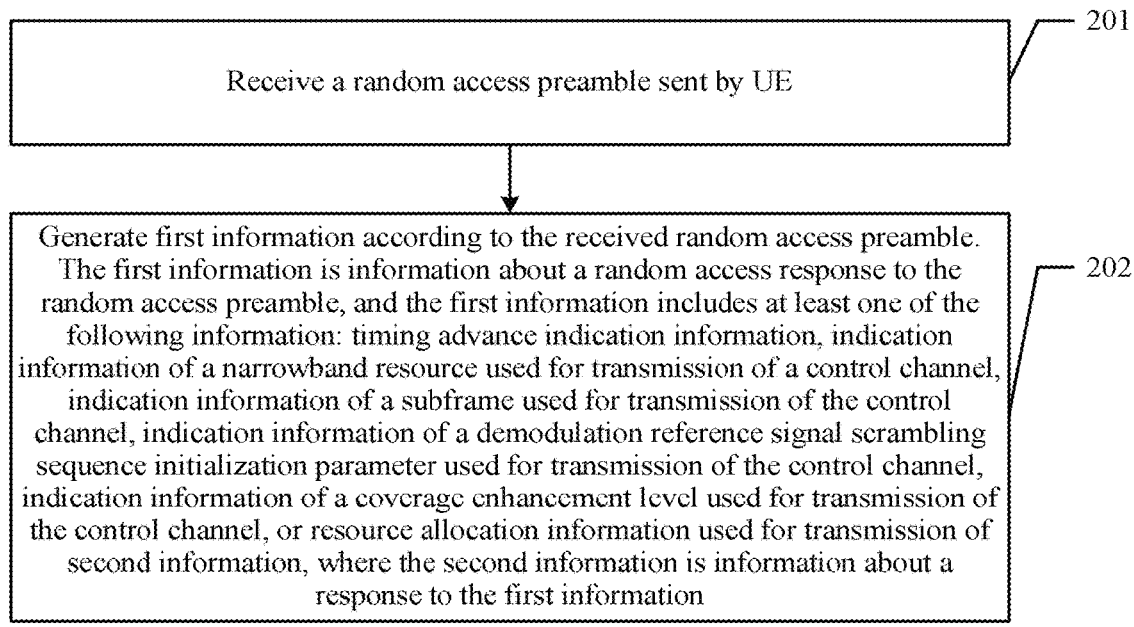
FIG. 2 is a schematic block flowchart of an information transmission method according to an embodiment of the present invention.

The present invention is a transmission method embodiment using an example in which information is information about a random access response, and may be applied to sending of information by the base station. Referring to FIG. 2, the information transmission method may include the following steps.

201. Receive a random access preamble sent by UE.

In a random access process provided in this embodiment of the present invention, the UE first sends a random access preamble to the base station. After receiving the random access preamble sent by the UE, the base station performs step 202.

202. Generate first information according to the received random access preamble.

The first information is information about a random access response to the random access preamble, and the first information includes at least one of the following information: timing advance indication information, indication information of a narrowband resource used for transmission of a control channel, indication information of a subframe used for transmission of the control channel, indication information of a demodulation reference signal scrambling sequence initialization parameter used for transmission of the control channel, indication information of a coverage enhancement level used for transmission of the control channel, or resource allocation information used for transmission of second information, where the second information is information about a response to the first information. The control channel in this embodiment of the present invention may be a control channel for scheduling a contention resolution message, or a UE-specific control channel, or an uplink control channel.

In this embodiment of the present invention, after receiving the random access preamble, the base station makes a response according to the random access preamble. The base station generates first information. The first information is information about a random access response to the random access preamble. Specifically, the information about the random access response may be transmitted by using a downlink control channel or a downlink data channel. To improve transmission efficiency of information that is used to respond to the random access preamble, and reduce overheads used by the UE to detect a channel, the base station needs to generate brief first information. In this embodiment of the present invention, the base station simplifies the information that is about the random access response and that needs to be generated, to obtain the first information. The first information includes at least one of the following information: 1) timing advance indication information, 2) indication information of a narrowband resource used for transmission of a control channel, 3) indication information of a subframe used for transmission of the control channel, 4) indication information of a demodulation reference signal scrambling sequence initialization parameter used for transmission of the control channel, 5) indication information of a coverage enhancement level used for transmission of the control channel, or 6) resource allocation information used for transmission of second information. The second information is information about a response to the first information. It should be noted that the first information may include any one, or any two, or any three, or any four, or any five of the foregoing six types of information, or include all the six types of information. Which type or types of information is or are specifically included in the first information may be specifically determined by an application scenario.

In some embodiments of the present invention, in addition to the at least one of the indication information shown in 1) to 6) described above, the first information provided in this embodiment of the present invention further includes at least one of the following four types of information: 7) indication information of a temporary cell-radio network temporary identifier, 8) indication information of the random access preamble, 9) rollback indication information, or 10) indication information of a control channel candidate set of the control channel. It should be noted that the first information may include any one, any two, or any three of the foregoing four types of information, or include all the four types of information. Which type or types of information is or are specifically included in the first information may be specifically determined by an application scenario.

In some embodiments of the present invention, in addition to the at least one of the indication information shown in 1) to 6) described above, or in addition to the at least one of the indication information shown in 1) to 10) described above, the first information provided in this embodiment of the present invention further includes at least one of the following four types of information: 11) frequency hopping indication information of the second information, 12) coverage enhancement transmission indication information of the second information, 13) start offset indication information of a physical uplink control channel resource, or 14) frequency hopping indication information of the control channel. It should be noted that the first information may include any one, any two, or any three of the foregoing four types of information, or include all the four types of information. Which type or types of information is or are specifically included in the first information may be specifically determined by an application scenario.

In some embodiments of the present invention, in addition to the at least one of the indication information shown in 1) to 6) described above, or in addition to the at least one of the indication information shown in 1) to 10) described above, or in addition to the at least one of the indication information shown in 1) to 14) described above, the first information provided in this embodiment of the present invention further includes at least one of the following seven types of information: 15) transmit power control indication information used by the UE to send the second information, 16) modulation and coding method indication information used by the UE to send the second information, 17) uplink delay indication information used by the UE to send the second information, 18) indication information indicating whether the UE reports channel state information, 19) start symbol indication information for transmission of a UE-specific message, 20) control channel configuration set identifier indication information of the control channel, or 21) indication information of a transmission type used for transmission of the control channel. It should be noted that the first information may include any one, or any two, or any three, or any four, or any five, or any six of the foregoing seven types of information, or include all the seven types of information. Which type or types of information is or are specifically included in the first information may be specifically determined by an application scenario.

In some embodiments of the present invention, the first information further includes: format indication information of the downlink control channel, or format indication information of the downlink data channel.

It should be noted that in this embodiment of the present invention, the first information may include one or more types of indication information in the foregoing description. For a specific implementation of such indication information, refer to a description of the first information in a subsequent embodiment.

203. Send the first information to the UE.

In this embodiment of the present invention, after generating simplified first information as described above, the base station sends the first information to the UE as the information about the random access response to the random access preamble.

Specifically, in some embodiments of the present invention, the first information further includes: the format indication information of the downlink control channel, or the format indication information of the downlink data channel. Step 203 of sending the first information to the UE includes the following steps:

A1. add the first information to the downlink control channel, and send the first information to the UE by using the downlink control channel; or A2. add the first information to the downlink data channel, and send the first information to the UE by using the downlink data channel.

In an implementation of step A1, the base station may specifically add the first information to downlink control information, and send the downlink control information by using the downlink control channel. The downlink control information includes the first information. In an implementation of step A2, the base station may specifically schedule the first information by using downlink control information. The base station sends the downlink control information by using the downlink control channel, and then sends the first information by using the downlink data channel. After receiving the downlink control information, the UE receives the first information according to an indication of the downlink control information. Because the first information has a more simplified structure than the random access response message in the prior art, power consumption overheads of channel detection by the UE are very small.

In some embodiments of the present invention, before step 203 of sending the first information to the UE, the information transmission method provided in this embodiment of the present invention may further include the following step:

B1. scramble the first information according to the radio network temporary identifier, where the radio network temporary identifier is determined according to the random access preamble.

Before sending the first UE, the base station may further scramble the first information by using the radio network temporary identifier. Because the radio network temporary identifier may be determined according to the random access preamble, the base station may not add an identifier of the random access preamble to the first information, but use the radio network temporary identifier as a scrambling code by using the first information, so as to indicate the random access preamble according to a correspondence between the radio network temporary identifier and the random access preamble. When the UE descrambles the first information, the UE may obtain the radio network temporary identifier used by the base station, so that the UE obtains the random access preamble corresponding to the radio network temporary identifier. In this embodiment of the present invention, the radio network temporary identifier may be a random access radio network temporary identifier. Certainly, the radio network temporary identifier may be any type of temporary identifier, provided that it is ensured that the radio network temporary identifier and the random access preamble have a correspondence.

In some embodiments of the present invention, after step 203 of sending the first information to the UE, the information transmission method provided in this embodiment of the present invention may further include the following step:

C1. scramble or descramble at least one of the second information, the control channel, or the UE-specific information according to the radio network temporary identifier, where the radio network temporary identifier is determined according to the random access preamble.

After the base station sends the first information to the UE, because the first information includes the resource allocation information used for transmission of the second information, the second information is information about a response to the first information. The UE sends the second information to the base station according to the resource allocation information that is used for transmission of the second information and that is included in the first information. When the base station receives the second information sent by the UE, the base station descrambles the second information according to the radio network temporary identifier. In addition, before sending the control channel or the UE-specific information to the UE, the base station scrambles the control channel or the UE-specific information according to the radio network temporary identifier. In this embodiment of the present invention, the radio network temporary identifier may be a random access radio network temporary identifier. Certainly, the radio network temporary identifier may be any type of temporary identifier, provided that it is ensured that the radio network temporary identifier and the random access preamble have a correspondence. In this embodiment of the present invention, the UE-specific information may be specifically a contention resolution message, UE-specific control information, or UE-specific data information. According to the prior art, a temporary cell-radio network temporary identifier (English full name: Temporary Cell-Radio Network Temporary Identifier, English acronym: TC-RNTI) needs to be used to scramble the contention resolution message. In this case, according to the prior art, the first information generated by the base station needs to carry the TC-RNTI. However, in this embodiment of the present invention, the first information generated by the base station does not carry the TC-RNTI. In this embodiment of the present invention, the base station uses the radio network temporary identifier as a scrambling code. When the UE descrambles the first information, the UE may obtain the radio network temporary identifier used by the base station. The radio network temporary identifier may also be used to descramble the contention resolution message, so that overheads caused when the first information carries a scrambling code of the contention resolution message are reduced. Alternatively, the base station uses the radio network temporary identifier to scramble the contention resolution message or the control channel. The radio network temporary identifier used to scramble the contention resolution message or the control channel may be the same as or may be different from the radio network temporary identifier used to scramble the first information.

It can be learned from the description of the present invention in the foregoing embodiment that, first, the random access preamble sent by the UE is received, and then the first information is generated according to the received random access preamble. The first information is the information about the random access response to the random access preamble. The first information includes at least one of the following information: the timing advance indication information, the indication information of the narrowband resource used for transmission of the control channel, the indication information of the subframe used for transmission of the control channel, the indication information of the demodulation reference signal scrambling sequence initialization parameter used for transmission of the control channel, the indication information of the coverage enhancement level used for transmission of the control channel, or the resource allocation information used for transmission of the second information. The second information is the information about the response to the first information. Finally, the first information is sent to the UE. The first information is information about a random access response, and the indication information included in the first information has fewer indicator bits. Therefore, the first information has a more simplified structure, so that access response information can be transmitted by using relatively fewer resources, thereby improving resource utilization efficiency in transmission of information about a random access response, and reducing power consumption overheads of channel detection by user equipment.

Figure 3:
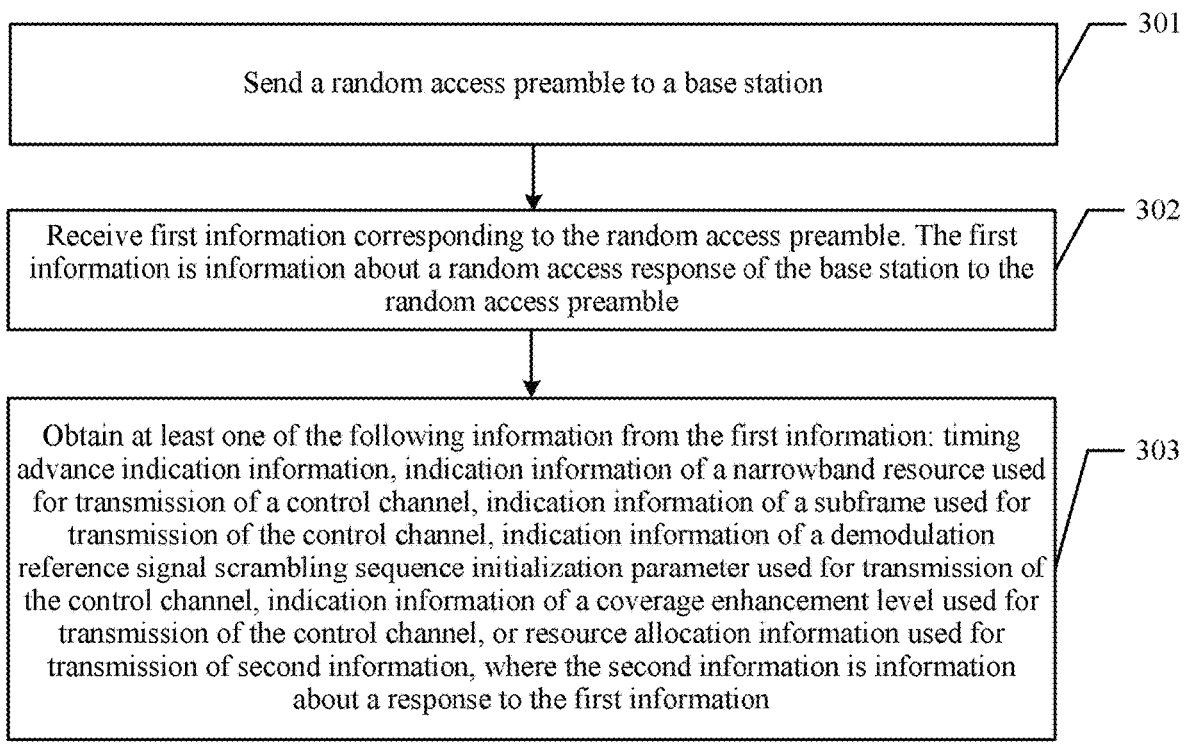
FIG. 3 is a schematic block flowchart of an information transmission method according to an embodiment of the present invention.

The information transmission method is described from a side of the base station in the foregoing embodiment. The following describes an information transmission method provided in the present invention from a side of a peer end (user equipment) of the base station. Referring to FIG. 3, the information transmission method provided in another embodiment of the present invention may include the following steps.

301. Send a random access preamble to a base station.

In a random access process provided in this embodiment of the present invention, the UE first sends the random access preamble to the base station. After sending the random access preamble, the UE performs step 302.

302. Receive first information corresponding to the random access preamble. The first information is information about a random access response of the base station to the random access preamble.

303. Obtain at least one of the following information from the first information: timing advance indication information, indication information of a narrowband resource used for transmission of a control channel, indication information of a subframe used for transmission of the control channel, indication information of a demodulation reference signal scrambling sequence initialization parameter used for transmission of the control channel, indication information of a coverage enhancement level used for transmission of the control channel, or resource allocation information used for transmission of second information, where the second information is information about a response to the first information.

In this embodiment of the present invention, after sending the random access preamble to the base station, the UE may receive the first information corresponding to the random access preamble. The first information received by the UE is first information simplified by the base station. Content included in the first information is less than that in the prior art. Therefore, complexity of detecting the first information by the UE can be greatly reduced. Specifically, the first information received by the UE is used as the information about the random access response to the random access preamble. The UE obtains, by using the first information, a response of the base station to the random access preamble.

In this embodiment of the present invention, the UE receives the first information corresponding to the random access preamble. The first information is the information about the random access response to the random access preamble. Specifically, the information about the random access response may be transmitted by using a downlink control channel, or may be transmitted by using a downlink data channel. To improve transmission efficiency of information that is used to respond to the random access preamble, and reduce overheads used by the UE to detect a channel, the base station needs to generate brief first information. In this embodiment of the present invention, brief first information received by the UE includes at least one of the following six types of information: 1) timing advance indication information, 2) indication information of a narrowband resource used for transmission of a control channel, 3) indication information of a subframe used for transmission of the control channel, 4) indication information of a demodulation reference signal scrambling sequence initialization parameter used for transmission of the control channel, 5) indication information of a coverage enhancement level used for transmission of the control channel, or 6) resource allocation information used for transmission of second information. The second information is information about a response to the first information. It should be noted that the first information may include any one, or any two, or any three, or any four, or any five of the foregoing six types of information, or include all the six types of information. Which type or types of information is or are specifically included in the first information may be specifically determined by an application scenario.

In some embodiments of the present invention, in addition to the at least one of the indication information shown in 1) to 6) described above, the first information provided in this embodiment of the present invention further includes at least one of the following four types of information: 7). indication information of a temporary cell-radio network temporary identifier, 8). indication information of the random access preamble, 9). rollback indication information, or 10). indication information of a control channel candidate set of the control channel. It should be noted that the first information may include any one, any two, or any three of the foregoing four types of information, or include all the four types of information. Which type or types of information is or are specifically included in the first information may be specifically determined by an application scenario.

In some embodiments of the present invention, in addition to the at least one of the indication information shown in 1) to 6) described above, or in addition to the at least one of the indication information shown in 1) to 10) described above, the first information provided in this embodiment of the present invention further includes at least one of the following four types of information: 11) frequency hopping indication information of the second information, 12) coverage enhancement transmission indication information of the second information, 13) start offset indication information of a physical uplink control channel resource, or 14) frequency hopping indication information of the control channel. It should be noted that the first information may include any one, any two, or any three of the foregoing four types of information, or include all the four types of information. Which type or types of information is or are specifically included in the first information may be specifically determined by an application scenario.

In some embodiments of the present invention, in addition to the at least one of the indication information shown in 1) to 6) described above, or in addition to the at least one of the indication information shown in 1) to 10) described above, or in addition to the at least one of the indication information shown in 1) to 14) described above, the first information provided in this embodiment of the present invention further includes at least one of the following seven types of information: 15) transmit power control indication information used by the UE to send the second information, 16) modulation and coding method indication information used by the UE to send the second information, 17) uplink delay indication information used by the UE to send the second information, 18) indication information indicating whether the UE reports channel state information, 19) start symbol indication information for transmission of a UE-specific message, 20) control channel configuration set identifier indication information of the control channel, or 21) indication information of a transmission type used for transmission of the control channel. It should be noted that the first information may include any one, or any two, or any three, or any four, or any five, or any six of the foregoing seven types of information, or include all the seven types of information. Which type or types of information is or are specifically included in the first information may be specifically determined by an application scenario.

In some embodiments of the present invention, the first information further includes: format indication information of the downlink control channel, or format indication information of the downlink data channel.

It should be noted that in this embodiment of the present invention, the first information may include one or more types of indication information in the foregoing description. For a specific implementation of such indication information, refer to a description of the first information in a subsequent embodiment.

Specifically, in some embodiments of the present invention, the first information further includes: the format indication information of the downlink control channel, or the format indication information of the downlink data channel. Step 302 of receiving, by the UE, first information corresponding to the random access preamble includes the following steps:

D1. receive the downlink control channel, and obtain the first information from the downlink control channel; or D2. receive the downlink data channel, and obtain the first information from the downlink data channel.

In an implementation of step D1, the base station may specifically add the first information to downlink control information, and send the downlink control information by using the downlink control channel. The downlink control information includes the first information. The UE obtains the first information by receiving the downlink control channel. In an implementation of step D2, the base station may specifically schedule the first information by using downlink control information. The base station sends the downlink control information by using the downlink control channel, and then sends the first information by using a downlink data channel. After receiving the downlink control information, the UE receives the first information according to an indication of the received downlink control information. Because the first information has a more simplified structure than the random access response message in the prior art, power consumption overheads of channel detection by the UE are very small.

In some embodiments of the present invention, in a process of receiving the first information in response to the random access preamble in step 302, the information transmission method provided in this embodiment of the present invention further includes the following step:

E1. descramble the first information according to the radio network temporary identifier, where the radio network temporary identifier is determined according to the random access preamble.

Before sending the first information, the base station may further scramble the first information by using the radio network temporary identifier. Because the radio network temporary identifier may be determined according to the random access preamble, the base station may not add an identifier of the random access preamble to the first information, but use the radio network temporary identifier as a scrambling code by using the first information, so as to indicate the random access preamble according to a correspondence between the radio network temporary identifier and the random access preamble. When the UE descrambles the first information, the UE may obtain the radio network temporary identifier used by the base station, so that the UE obtains the random access preamble corresponding to the radio network temporary identifier. In this embodiment of the present invention, the radio network temporary identifier may be a random access radio network temporary identifier. Certainly, the radio network temporary identifier may be any type of temporary identifier, provided that it is ensured that the radio network temporary identifier and the random access preamble have a correspondence.

In some embodiments of the present invention, after step 302 of receiving first information corresponding to the random access preamble, the information transmission method provided in this embodiment of the present invention further includes the following steps:

F1. perform at least one of the following steps: sending the second information, receiving control information, or receiving the UE-specific information; and F2. scramble or descramble at least one of the second information, the control channel, or the UE-specific information according to the radio network temporary identifier, where the radio network temporary identifier is determined according to the random access preamble.

After the base station sends the first information to the UE, because the first information includes the resource allocation information used for transmission of the second information, the second information is information about a response to the first information. The UE sends the second information to the base station according to the resource allocation information that is used for transmission of the second information and that is included in the first information. When the base station receives the second information sent by the UE, the base station descrambles the second information according to the radio network temporary identifier. In addition, before sending the control channel or the UE-specific information to the UE, the base station scrambles the control channel or the UE-specific information according to the radio network temporary identifier. In this embodiment of the present invention, the radio network temporary identifier may be a random access radio network temporary identifier. Certainly, the radio network temporary identifier may be any type of temporary identifier, provided that it is ensured that the radio network temporary identifier and the random access preamble have a correspondence. In this embodiment of the present invention, the UE-specific information may be specifically a contention resolution message. In the prior art, a TC-RNTI needs to be used to scramble the contention resolution message. In this case, according to the prior art, the first information generated by the base station needs to carry the TC-RNTI. However, in this embodiment of the present invention, the first information generated by the base station does not carry the TC-RNTI. In this embodiment of the present invention, the base station uses the radio network temporary identifier as a scrambling code. The base station does not add the identifier of the random access preamble to the first information, but uses the radio network temporary identifier as a scrambling code by using the first information, so as to indicate the random access preamble according to a correspondence between the radio network temporary identifier and the random access preamble. When the UE descrambles the first information, the UE may obtain the radio network temporary identifier used by the base station. The radio network temporary identifier may also be used by the UE to descramble the contention resolution message, so that overheads caused when the first information carries a scrambling code are reduced. Alternatively, the base station scrambles the control channel or the UE-specific information by using the radio network temporary identifier, and the UE descrambles the control channel or the UE-specific information by using the radio network temporary identifier. The radio network temporary identifier is determined according to the random access preamble. The radio network temporary identifier used to scramble the contention resolution message or the control channel may be the same as or may be different from the radio network temporary identifier used to scramble the first information.

It can be learned from the description of the present invention in the foregoing embodiment that, first, the UE sends the random access preamble, and then the UE receives the first information corresponding to the random access preamble. The first information is the information about the random access response to the random access preamble. The first information includes at least one of the following information: the timing advance indication information, the indication information of the narrowband resource used for transmission of the control channel, the indication information of the subframe used for transmission of the control channel, the indication information of the demodulation reference signal scrambling sequence initialization parameter used for transmission of the control channel, the indication information of the coverage enhancement level used for transmission of the control channel, or the resource allocation information used for transmission of the second information. The second information is the information about the response to the first information. Finally, the first information is sent to the UE. The first information is information about a random access response, and the indication information included in the first information has fewer indicator bits. Therefore, the first information has a more simplified structure, so that access response information can be transmitted by using relatively fewer resources, thereby improving resource utilization efficiency in transmission of information about a random access response, and reducing power consumption overheads of channel detection by user equipment.

According to this embodiment, transmission of information about a random access response is used as an example for description. The information about the random access response may be the foregoing first information. The information about the random access response is a response to the received random access preamble. The information about the random access response may be control information carried on the control channel and/or data information carried on a data channel. Therefore, the information about the random access response may be included in the downlink control information, and transmitted by using the downlink control channel. Alternatively, the information about the random access response may be included in downlink data information, and transmitted by using the downlink data channel. Specifically, the information about the random access response may be downlink control information for scheduling a random access response and/or a random access response.

In this embodiment of the present invention, the information about the random access response may include: indication information of the random access preamble. The indication information of the random access preamble may be a simplified random access preamble identifier (English full name: Random Access Preamble IDentitfier, English acronym: RAPID). The RAPID is used to identify a random access preamble (English name: preamble) randomly selected by the UE in the random access process. The existing LTE protocol supports that there are 64 random access preambles on one physical random access channel (English full name: Physical Random Access CHannel, English acronym: PRACH) resource, and therefore, it indicates that the RAPID needs 6 bits. In a coverage enhancement scenario, a coverage enhancement level (for example, the coverage enhancement level is a repeat level or a quantity of repeats) and a random access resource have a one-to-one mapping relationship. If the foregoing correspondence is based on a one-to-one correspondence between a preamble group and a coverage enhancement level, it indicates that a bit quantity of the RAPID may be reduced. For example, there are 64 preambles, supporting three coverage enhancement levels in total. A quantity of preambles of the three levels is approximately evenly divided, and there may be 21 or 22 preambles of each level. In this case, only 5 bits (English: bit) need to be used to indicate the preambles. Further, if a small quantity of preambles are allocated to a level, a smaller quantity of bits may be needed to indicate the preambles. If a quantity of preambles allocated to a level is denoted as num_preamble, a quantity of bits that are needed to indicate the RAPID and that correspond to the PRACH group may be: ⌈log 2(num_preamble⌉. The parentheses in the formula indicate rounding up.

In addition, the base station may further implicitly indicate the received random access preamble, and in the information about the random access response, no bit or a few bits are used to indicate the RAPID. For example, in the prior art, a radio network temporary identifier is used for a random access response. The radio network temporary identifier is determined according to a time index (that is, a subframe number) and a frequency resource index that are used for transmission of the random access preamble. Therefore, the radio network temporary identifier may implicitly represent the time index and the frequency resource index. Similarly, if the radio network temporary identifier is determined according to an index of the random access preamble, the radio network temporary identifier may implicitly indicate the random access preamble or a number of the random access preamble. For example, assuming that there are 64 radio network temporary identifiers, and each of the radio network temporary identifiers corresponds to one random access preamble, the radio network temporary identifier used to scramble the random access response may indicate the identifier of the random access preamble. For another example, assuming that there are 32 radio network temporary identifiers, and each of the radio network temporary identifiers corresponds to two random access preambles, in the information about the random access response, one bit may further be used to further indicate (or used to distinguish) one of the foregoing two random access preambles. For example, the radio network temporary identifier associated with the random access preamble may be predetermined or configured through signaling configuration. The association relationship between the radio network temporary identifier and the random access preamble may be predetermined or configured through signaling configuration. For example, a radio network temporary identifier set or range is predetermined, and each radio network temporary identifier in the radio network temporary identifier set or range is associated with the determined random access preamble. For example, a function relationship between the radio network temporary identifier and the index of the random access preamble may be predetermined. For example, a function definition manner may be used: RNTI=function(t_id,f_id,preamble_id) or RNTI=function (preamble_id). Herein, t_id is an index of a PRACH time resource (within one or more radio frames), f_id is an index of a PRACH frequency resource, and preamble_id is an index of the random access preamble. Specifically, a function relationship may be RNTI=1+t_id+N×f_id+M×preamble_id, where N and M are prefixed constants. For example, N is an index quantity of time resources, and M is a product of an index quantity of PRACH frequency resources and an index quantity of PRACH time resources.

If the time resources are in a unit of a subframe, one radio frame has a maximum of 10 subframes to send preambles, that is, N=10. If the PRACH time resources are in a unit of X subframes, one radio frame has a maximum of ceil (10/X) time resources to send preambles, where ceil indicates rounding up, that is, N=ceil(10/X). If the PRACH time resources are resources in Y radio frames, and the PRACH time resources are in a unit of X subframes, the Y radio frames have a maximum of ceil (Y×10/X) time resources to send preambles, that is, N=ceil(Y×10/X). For example, in a coverage enhancement scenario, sending of a preamble needs to be repeated. Therefore, there are much fewer random access opportunities within a same period of time. For example, similarly, for a subframe of 10 ms, each subframe may have a random access resource at best according to the existing protocol, that is, there are 10 random access opportunities. However, in the coverage enhancement scenario, even if a quantity of repeats is two, there are a maximum of five random access opportunities. This may reduce a quantity of random access opportunities, that is, may reduce a quantity of radio network temporary identifiers.

The index of the PRACH frequency resource and the index quantity of the PRACH frequency resource may be individually numbered for each coverage enhancement level. For example, for a coverage enhancement level 1, there are two PRACH frequency resources, indexes are separately {0,1}, and an index quantity of the PRACH frequency resources is two. For a coverage enhancement level 2, there are three PRACH frequency resources, indexes are separately {0,1,2}, and an index quantity of the PRACH frequency resources is three. The index of the PRACH frequency resource and the index quantity of the PRACH frequency resource may be jointly numbered for multiple coverage enhancement levels. For example, for a coverage enhancement level 1, there are two PRACH frequency resources, and indexes are separately {0,1}. For a coverage enhancement level 2, there are three PRACH frequency resources, and indexes are separately {2,3,4}. An index quantity of the PRACH frequency resources is five. For another example, the index quantity of the PRACH frequency resources may be individually determined by a frequency division duplex system and a time division duplex system, or determined according to a larger index quantity of PRACH frequency resources in a frequency division duplex system and a time division duplex system. For example, there are a maximum of F1 PRACH frequency resources in the frequency division duplex system, and there are a maximum of F2 PRACH frequency resources in a time division duplex system. In this case, the index quantity of the PRACH frequency resources is equal to Max(F1,F2), where Max is a MAX function, and F1 and F2 are constants.

In some embodiments of the present invention, the indication information of the random access preamble is used to indicate whether the base station detects the random access preamble. For example, a bitmap may be used to indicate the indication information of the random access preamble. Each bit in a bit string correspondingly indicates whether the base station receives one or more random access preambles. For example, one PRACH resource group includes 16 preambles, and 16 bits may be used to indicate, according to a bitmap indication method, whether the base station detects a random access preamble. Each bit correspondingly indicates one random access preamble.

In some embodiments of the present invention, the information about the random access response may include: indication information of a temporary cell-radio network temporary identifier (English full name: Temporary Cell-Radio Network Temporary Identifier, English acronym: TC-RNTI). In the prior art, the TC-RNTI has 16 bits. In this embodiment of the present invention, the TC-RNTI may not be transmitted in the information about the random access response. This may save 16 bits. Alternatively, some bits in the TC-RNTI are transmitted in the information about the random access response. For example, 8 bits in the TC-RNTI are transmitted in the information about the random access response. This may save 8 bits. However, according to the existing protocol, both a message 3 (that is, a response message of the UE to the information about the random access response, that is, a message equivalent to the second information in the foregoing embodiment) and a message 5 (that is, a contention conflict resolution message and/or a control channel for scheduling a contention conflict resolution message) in the random access process are transmitted based on TC-RNTI scrambling or descrambling. If the TC-RNTI is not transmitted in the information about the random access response, new scrambling codes need to be defined for transmission of the message 3 and a message 4. This embodiment of the present invention provides a manner as follows: The radio network temporary identifier used to scramble the information about the random access response is used to scramble or descramble the message 3 and the message 4. The scrambling codes used for transmission of the message 3 and the message 4 all use a newly defined radio network temporary identifier. The radio network temporary identifier is determined according to the random access preamble (for example, determined according to a root or a preamble index, where a specific determining method is described in the foregoing embodiment). Alternatively, the information about the random access response uses an existing RA-RNTI (that is, the RA-RNTI is not determined according to the random access preamble). New scrambling codes are used for transmission of the message 3 and the message 4. The new scrambling codes are determined according to the random access preamble. A method for determining the scrambling codes is similar to the foregoing method for determining the radio network temporary identifier according to the random access preamble. Alternatively, the information about the random access response, both the message 3 and the message 4 are scrambled by using newly defined radio network temporary identifiers. Therefore, in this embodiment of the present invention, the information about the random access response does not need to carry the TC-RNTI, thereby reducing load of the information about the random access response.

It should be noted that if a message 2 and the message 4 cannot be distinguished by using scrambling codes, the message 2 and the message 4 may be distinguished in a frequency domain. For example, the message 2 and the message 4 are scheduled in different narrowbands.

In some embodiments of the present invention, the information about the random access response may include: the frequency hopping indication information of the second information. 0, 1, or 2 bits are used for a frequency hopping switch indication or a frequency hopping pattern indication. If a frequency hopping manner is predefined, or frequency hopping is not supported, the frequency hopping indication herein may be omitted. Otherwise, 1 bit may be used to indicate whether frequency hopping is supported. Alternatively, 2 bits are used to indicate a frequency hopping pattern. For example, 00 indicates that frequency hopping is not performed, 01 indicates that frequency hopping is performed, and a granularity of the frequency hopping is X1. 10 indicates that frequency hopping is performed, and a granularity of the frequency hopping is X2. 11 indicates that frequency hopping is performed, and a granularity of the frequency hopping is X3. Alternatively, some states in the 2 bits are reserved. The granularity of the frequency hopping herein is a time interval at which frequency hopping is performed from one frequency band to another frequency band, and may specifically include a frequency tuning time or may not include a frequency tuning time. For example, 00 indicates that frequency hopping is not performed, 01 indicates a frequency hopping pattern 1, 10 indicates a frequency hopping pattern 2, and 11 indicates a frequency hopping pattern 3. The frequency hopping pattern defines an interval of the frequency hopping and determines a frequency resource location of the frequency hopping.

In some embodiments of the present invention, the information about the random access response may include: the resource allocation information used for transmission of the second information.

A method 1: Indicating a narrowband resource and indicating resource allocation within a narrowband.

A narrowband resource is a frequency resource that occupies a specific frequency width on a carrier. For example, the narrowband may include one or more physical resource blocks (English full name: Physical Resource Block, English acronym: PRB) or resource blocks, or may include one or more subcarriers. Alternatively, a frequency resource width and a frequency resource location of the narrowband is predetermined or preconfigured. Usually, a frequency width occupied by a narrowband resource does not exceed a bandwidth that can be supported by UE with low complexity or low costs.

The information about the random access response may indicate only a specific narrowband resource. Certainly, the narrowband resource may be determined according to a default rule. In this case, the information about the random access response does not need to indicate the narrowband resource. For example, a narrowband resource of the second information is determined according to a PRACH narrowband resource (for example, the narrowband resource of the second information is the same as the PRACH narrowband resource) or determined according to a specific downlink channel narrowband resource and duplex spacing.

After the narrowband resource is determined, resource allocation within the narrowband further needs to be determined. The information about the random access response may further specifically indicate the resource allocation within the narrowband. If the transmission of the second information occupies all narrowband resources or occupies only a specified resource block in the narrowband resource, the information about the random access response does not need to indicate the resource allocation within the narrowband. If the transmission of the second information occupies only one PRB, 3 bits may be used to indicate a specific resource block within the narrowband.

For example, the UE can support a maximum of N PRBs at the same time. If N=6, 6 bits may be used for the indication in a bitmap indication manner. To reduce a bit quantity of the indication, a value of N may be limited. For example, a maximum N is equal to 2 or 3, and in this case, 3 bits or 4 bits may be used for the indication. For example, it is assumed that the narrowband includes six PRBs, and indexes of the PRBs are separately: a PRB n, a PRB n+1, a PRB n+2, a PRB n+3, a PRB n+4, and a PRB n+5. An indication method is illustrated in the following Table 1:

| Resource indication bit status within the narrowband | Resource within the narrowband |
| --- | --- |
| 000 | PRB n |
| 001 | PRB n + 1 |
| 010 | PRB n + 2 |
| 011 | PRB n + 3 |
| 100 | PRB n + 4 |
| 101 | PRB n + 5 |
| 110 | PRB n, PRB n + 1 |
| 111 | PRB n + 2, PRB n + 3 |

Method 2: Indicating a start PRB and a quantity of occupied PRBs of the UE

The UE can support a maximum of N PRBs at the same time. If N=6, for a system bandwidth of 20 MHz, there are (95×6+5+4+3+2+1) possibilities. Therefore, 10 bits are needed to indicate resources. For example, for the bandwidth of 20 MHz, there are 100 PRBs, separately numbered from 0 to 99. In this case, if a starting point of the resources is PRBs numbered 0 to 94, allocated resources may have zero PRBs, one PRB, two PRBs, three PRBs, four PRBs, or five PRBs. That is, there are six cases. Therefore, 95×6 is calculated. If a start position is numbered 95, there are only five cases for a length: zero PRBs, one PRB, two PRBs, three PRBs, and four PRBs. Therefore, 5 is added. The rest may be deduced by analogy. When a starting number is 96, there are only four cases. When the starting number is 97, there are only three cases. When the starting number is 98, there are only two cases. When the starting number is 99, there is only one case. The following Table 2 shows relationships between different system bandwidths and needed quantities of bits:

| System bandwidth | Quantity of bits |
| --- | --- |
| 1.4 MHz | 5 |
| 3 MHz | 7 |
| 5 MHz | 8 |
| 10 MHz | 9 |
| 15 MHz | 9 |
| 20 MHz | 10 |

In some embodiments of the present invention, the information about the random access response may include: the coverage enhancement transmission indication information of the second information. The coverage enhancement transmission indication information of the second information may be a repeat level or a quantity of repeats of transmission of the second information. For example, 0 to 2 bits may be used to indicate coverage enhancement transmission information of the second information. If the repeat level (or the quantity of repeats) of transmission of the second information is determined completely according to a repeat level (or a quantity of repeats) of a previous channel of the second information, the information about the random access response does not need to indicate the repeat level (or the quantity of repeats) of transmission of the second information. The previous channel of the second information may be the random access preamble or the first information.

If the repeat level (or the quantity of repeats) of transmission of the second information is not determined according to the repeat level (or the quantity of repeats) of the previous channel of the second information, the information about the random access response needs to indicate the repeat level (or the quantity of repeats) of transmission of the second information. The quantity of repeats of the second information may be obtained by adding a quantity A of repeats and a quantity B of repeats. The quantity A of repeats is a quantity of repeats that is determined according to a coverage enhancement level, a quantity of repeats that is configured through higher layer signaling configuration, or a predetermined quantity of repeats. The quantity B of repeats is a quantity of repeats that is indicated by the information about the random access response. Therefore, the quantity B of repeats that is indicated by the information about the random access response may be considered as tuning of the quantity A of repeats. Certainly, replacing the foregoing quantity of repeats with a bundled transmission size is also content of the present invention. 1, 2, or 3 bits may be used to indicate the repeat level (or the quantity of repeats) of the second information in the information about the random access response.

In some embodiments of the present invention, the information about the random access response may include: transmit power control indication information used by the UE to send the second information. If power control is not needed for the transmission of the second information, the transmit power control indication information of the second information is not needed. Otherwise, 1 to 3 bits may be used to indicate the transmit power control indication information of the second information. It should be noted that the transmit power control indication information of the second information and the coverage enhancement transmission indication information of the second information may be a same field. During non-coverage enhancement, the field functions as the transmit power control indication information of the second information. During coverage enhancement, the field functions as the coverage enhancement transmission indication information of the second information.

In some embodiments of the present invention, the information about the random access response may include: modulation and coding method indication information used by the UE to send the second information. A modulation and coding method used for transmission of the second information may be predefined. In this case, the first information does not include the modulation and coding method indication information used for transmission of the second information. Alternatively, 1 to 4 bits may be further used to indicate a modulation and coding method used for transmission of the second information.

In some embodiments of the present invention, the information about the random access response may include: the timing advance indication information. The timing advance indication information occupies 0 to 11 bits. A granularity of a timing advance indication may be increased, and a bit quantity for indicating timing advance may be reduced. For example, a current timing advance field length is 11 bits, used to identify 0 to 1282 possible timing adjustment values. If the bits of the field are reduced, for example, to 5 bits, only 32 possible timing advance adjustment values can be identified. Compared with the 1282 values originally, a granularity of timing adjustment is increased. For example, for a same timing advance adjustment range, 1283 segments may be originally obtained through division, and 111 bits are separately used to indicate specific timing advance. However, currently, only 32 segments are obtained through division, and 5 bits are used to indicate specific timing advance.

In some embodiments of the present invention, the information about the random access response may include: rollback indication information of a random access channel. There may be no rollback indication, or 1 to 4 bits are used to indicate a rollback indication.

In some embodiments of the present invention, the information about the random access response may include: indication information of a narrowband resource used for transmission of the control channel. In the present invention, the control channel may be a control channel for scheduling a contention resolution message or a UE-specific control channel. For example, ceil(log 2(narrowband_number) bits or 4 bits are used to indicate the indication of the narrowband resource used for transmission of the control channel. Herein, narrowband_number is a narrowband quantity configured by a network.

In some embodiments of the present invention, the information about the random access response may include: indication information of a control channel candidate set of the control channel. For example, Xi bits are used to indicate the control channel candidate set of the control channel for scheduling the contention resolution message, where Xi is a constant.

In some embodiments of the present invention, the information about the random access response may include: indication information of a subframe used for transmission of the control channel. A configuration of the subframe used for transmission of the control channel includes one or more of a starting subframe configuration, a quantity of subframes occupied by repeat transmission, or a location indication.

In some embodiments of the present invention, the information about the random access response may include: start symbol indication information for transmission of a UE-specific message. Particularly, the UE-specific message is the message 4 or a control channel for scheduling the message 4. A start symbol for transmission of the UE-specific message may be fixedly set, or system information may be fixedly used to indicate a start symbol for transmission of the UE-specific message. Typically, 2 bits are used to indicate the start symbol of the UE-specific message.

In some embodiments of the present invention, the information about the random access response may include: control channel configuration set identifier indication information of the control channel. A control channel set transmission configuration identifier (English full name: Identity, English acronym: ID) may be fixedly set to 0. Alternatively, 1 bit is used to indicate a control channel set transmission configuration ID.

In some embodiments of the present invention, the information about the random access response may include: indication information of a transmission type used for transmission of the control channel. The transmission type of the control channel may be fixedly set. For example, the transmission type is fixed set to centralized transmission or distributed transmission. Alternatively, 1 bit is used to indicate whether the transmission type is centralized transmission or distributed transmission.

In some embodiments of the present invention, the information about the random access response may include: indication information of a demodulation reference signal scrambling sequence initialization parameter used for transmission of the control channel. 9 bits or fewer bits may be used to indicate the demodulation reference signal scrambling sequence initialization parameter used for transmission of the control channel.

In some embodiments of the present invention, the information about the random access response may include: start offset indication information of a physical uplink control channel resource.

In some embodiments of the present invention, the information about the random access response may include: frequency hopping indication information of the control channel. For example, 0 to 2 bits are used to indicate whether frequency hopping is performed or indicate a frequency hopping parameter indication.

In some embodiments of the present invention, the information about the random access response may include: indication information of a coverage enhancement level used for transmission of the control channel. Optionally, 0 to 3 bits may be used to indicate the coverage enhancement level (for example, a repeat level) used for transmission of the control channel or a quantity of repeats. If the repeat level (or the quantity of repeats) of transmission of the control channel is determined according to a repeat level (or a quantity of repeats) of a channel before transmission of the control channel, the random access response does not need to indicate the repeat level (or the quantity of repeats) of transmission of the control channel. The channel before transmission of the control channel may be a random access preamble, or a control channel for scheduling the random access response, or a channel for carrying the random access response, or second information. Otherwise, 1, 2, or 3 bits may be used to indicate the repeat level (or the quantity of repeats) of transmission of the control channel.

In some embodiments of the present invention, the information about the random access response may include: the format indication information of the downlink control channel, or the format indication information of the downlink data channel. For example, the format indication information is used to indicate a format of currently determined information, for example, the format indication information indicates whether the currently determined information is scheduling information or information about a random access response; and/or the format indication information indicates whether the first information is uplink grant information or downlink grant information.

In some embodiments of the present invention, the information about the random access response may include: uplink delay indication information used by the UE to send the second information. The uplink delay indication information may occupy 0 to 1 bit. If there is no uplink delay, the information about the random access response does not need to include the uplink delay indication information.

In some embodiments of the present invention, the information about the random access response may include: indication information indicating whether the UE reports channel state information. The indication information indicating whether to report channel state information may occupy 0 to 1 bit. For example, when the channel state information does not need to be requested, the information about the random access response does not need to include the uplink delay indication information.

It should be noted that in the foregoing embodiment, if an indication bit of a piece of indication information is 0 bits, it means that the first information does not include an indication of the information. Specifically, the first information may include multiple types of indication information. The base station sends the first information in one or more specific formats, and the UE receives the first information in one or more specific formats.

It should be additionally noted that the base station may indicate whether the downlink control information carries the information about the random access response. For example, the base station indicates, in a PRACH resource configuration corresponding to each coverage enhancement level, whether information about a random access response that corresponds to a PRACH of the coverage enhancement level is carried by using the downlink control information. Alternatively, it is determined, according to an implicit manner, whether the downlink control information carries the information about the random access response. For example, for a coverage enhancement (for example, repeat transmission) level X, the downlink control information carries the information about the random access response. For example, for a coverage enhancement level Y, the downlink control information carries the information about the random access response. Usually, a quantity of repeats needed by the coverage enhancement level X is greater than a quantity of repeats needed by the coverage enhancement level Y.

It should be noted that for each of the foregoing method embodiments, for ease of description, the method embodiments are all described as a series of action combinations, but persons skilled in the art should learn that the present invention is not limited to an order of described actions because according to the present invention, some steps may use another order or be performed at the same time. In addition, persons skilled in the art should also learn that all the embodiments described in this specification are preferred embodiments, and the related actions and modules are not necessarily mandatory to the present invention.

To better implement the foregoing solutions of the embodiments of the present invention, the following further provides related apparatuses for implementing the foregoing solutions.

Referring to FIG. 4-a, an embodiment of the present invention provides a base station 400, which may include: a receiving module 401, an information generation module 402, and a sending module 403.

The receiving module 401 is configured to receive a random access preamble sent by user equipment UE.

The information generation module 402 is configured to generate first information according to the received random access preamble, where the first information is information about a random access response to the random access preamble, and the first information includes at least one of the following information: timing advance indication information, indication information of a narrowband resource used for transmission of a control channel, indication information of a subframe used for transmission of the control channel, indication information of a demodulation reference signal scrambling sequence initialization parameter used for transmission of the control channel, indication information of a coverage enhancement level used for transmission of the control channel, or resource allocation information used for transmission of second information, where the second information is information about a response to the first information.

The sending module 403 is configured to send the first information to the UE.

In some embodiments of the present invention, the first information further includes at least one of the following information: indication information of a temporary cell-radio network temporary identifier, indication information of the random access preamble, rollback indication information, or indication information of a control channel candidate set of the control channel.

In some embodiments of the present invention, the first information further includes at least one of the following information: frequency hopping indication information of the second information, coverage enhancement transmission indication information of the second information, start offset indication information of a physical uplink control channel resource, or frequency hopping indication information of the control channel.

In some embodiments of the present invention, the first information further includes at least one of the following information: transmit power control indication information used by the UE to send the second information, modulation and coding indication information used by the UE to send the second information, uplink delay indication information used by the UE to send the second information, indication information indicating whether the UE reports channel state information, start symbol indication information for transmission of a UE-specific message, control channel configuration set identifier indication information of the control channel, or indication information of a transmission type used for transmission of the control channel.

In some embodiments of the present invention, the first information further includes:

format indication information of the downlink control channel, or format indication information of the downlink data channel.

In some embodiments of the present invention, the sending module is specifically configured to: add the first information to the downlink control channel, and send the first information to the UE by using the downlink control channel; or add the first information to the downlink data channel, and send the first information to the UE by using the downlink data channel.

In some embodiments of the present invention, referring to FIG. 4-b, the base station 400 further includes a scrambling module 404, configured to: before the sending module 403 sends the first information to the UE, scramble the first information according to the radio network temporary identifier, where the radio network temporary identifier is determined according to the random access preamble.

In some embodiments of the present invention, referring to FIG. 4-c, the base station 400 further includes a scrambling/descrambling module 405, configured to: after the sending module 403 sends the first information to the UE, scramble or descramble at least one of the second information, the control channel, or the UE-specific information according to the radio network temporary identifier, where the radio network temporary identifier is determined according to the random access preamble.

It can be learned from the description of the present invention in the foregoing embodiment that, first, the random access preamble sent by the UE is received, and then the first information is generated according to the received random access preamble. The first information is the information about the random access response to the random access preamble, and the first information includes at least one of the following information: the timing advance indication information, the indication information of the narrowband resource used for transmission of the control channel, the indication information of the subframe used for transmission of the control channel, the indication information of the demodulation reference signal scrambling sequence initialization parameter used for transmission of the control channel, the indication information of the coverage enhancement level used for transmission of the control channel, or the resource allocation information used for transmission of the second information. The second information is the information about the response to the first information. Finally, the first information is sent to the UE. The first information is information about a random access response, and the foregoing indication information included in the first information has fewer indicator bits. Therefore, the first information has a more simplified structure, so that access response information can be transmitted by using relatively fewer resources, thereby improving resource utilization efficiency in transmission of information about a random access response, and reducing power consumption overheads of channel detection by user equipment.

Referring to FIG. 5, an embodiment of the present invention provides user equipment 500, which may include: a sending module 501, a receiving module 502, and an obtaining module 503.

The sending module 501 is configured to send a random access preamble to a base station.

The receiving module 502 is configured to receive first information corresponding to the random access preamble, where the first information is information about a random access response of the base station to the random access preamble.

The obtaining module 503 is configured to obtain at least one of the following information from the first information: timing advance indication information, indication information of a narrowband resource used for transmission of a control channel, indication information of a subframe used for transmission of the control channel, indication information of a demodulation reference signal scrambling sequence initialization parameter used for transmission of the control channel, indication information of a coverage enhancement level used for transmission of the control channel, or resource allocation information used for transmission of second information, where the second information is information about a response to the first information.

In some embodiments of the present invention, the first information further includes at least one of the following information: indication information of a temporary cell-radio network temporary identifier, indication information of the random access preamble, rollback indication information, or indication information of a control channel candidate set of the control channel.

In some embodiments of the present invention, the first information further includes at least one of the following information: frequency hopping indication information of the second information, coverage enhancement transmission indication information of the second information, start offset indication information of a physical uplink control channel resource, or frequency hopping indication information of the control channel.

In some embodiments of the present invention, the first information further includes at least one of the following information: transmit power control indication information used by the UE to send the second information, modulation and coding method indication information used by the UE to send the second information, uplink delay indication information used by the UE to send the second information, indication information indicating whether the UE reports channel state information, start symbol indication information for transmission of a UE-specific message, control channel configuration set identifier indication information of the control channel, or indication information of a transmission type used for transmission of the control channel.

In some embodiments of the present invention, the first information further includes: format indication information of the downlink control channel, or format indication information of the downlink data channel.

In some embodiments of the present invention, the receiving module 502 is specifically configured to: receive the downlink control channel, and obtain the first information from the downlink control channel; or receive the downlink data channel, and obtain the first information from the downlink data channel.

In some embodiments of the present invention, referring to FIG. 5-b, the user equipment 500 further includes a descrambling module 504, configured to descramble the first information according to the radio network temporary identifier, where the radio network temporary identifier is determined according to the random access preamble.

In some embodiments of the present invention, referring to FIG. 5-c, the user equipment 500 further includes a scrambling/descrambling module 505.

The receiving module 502 is further configured to: after receiving the first information corresponding to the random access preamble, receive at least one of the following: the control channel, or the UE-specific information.

The sending module is further configured to: after the receiving module receives the first information corresponding to the random access preamble, send the second information.

The scrambling/descrambling module 505 is configured to scramble or descramble at least one of the second information, the control channel, or the UE-specific information according to the radio network temporary identifier, where the radio network temporary identifier is determined according to the random access preamble.

It can be learned from the description of the present invention in the foregoing embodiment that, first, the UE sends the random access preamble, and then the UE receives the first information corresponding to the random access preamble. The first information is the information about the random access response to the random access preamble. The first information includes at least one of the following information: the timing advance indication information, the indication information of the narrowband resource used for transmission of the control channel, the indication information of the subframe used for transmission of the control channel, the indication information of the demodulation reference signal scrambling sequence initialization parameter used for transmission of the control channel, the indication information of the coverage enhancement level used for transmission of the control channel, or the resource allocation information used for transmission of the second information. The second information is the information about the response to the first information. Finally, the first information is sent to the UE. The first information is information about a random access response, and the foregoing indication information included in the first information has fewer indicator bits. Therefore, the first information has a more simplified structure, so that access response information can be transmitted by using relatively fewer resources, thereby improving resource utilization efficiency in transmission of information about a random access response, and reducing power consumption overheads of channel detection by user equipment.

An embodiment of the present invention further provides a computer storage medium, where the computer storage medium stores a program, and the program performs some or all of the steps recorded in the foregoing method embodiments.

Figure 6:
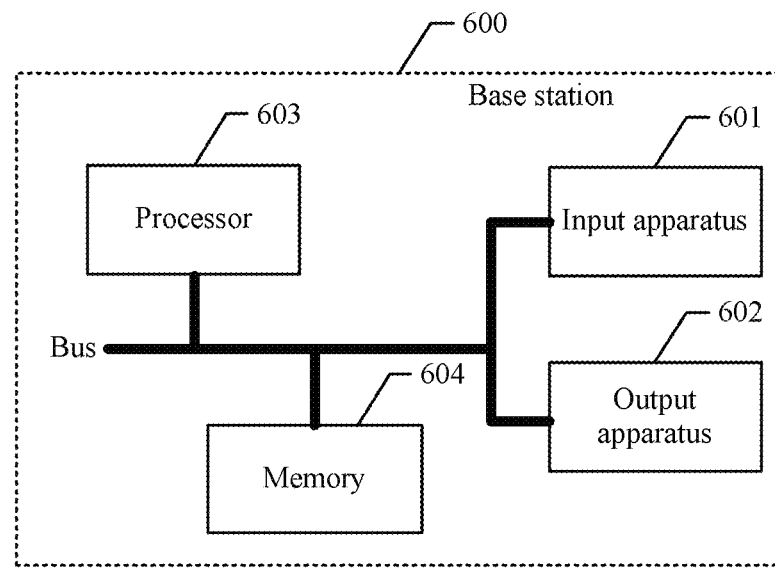
FIG. 6 is a schematic structural composition diagram of another base station according to an embodiment of the present invention.

The following describes another base station provided by an embodiment of the present invention. Referring to FIG. 6, the base station 600 includes:

an input apparatus 601, an output apparatus 602, a processor 603, and a memory 604 (a quantity of processors 603 in the base station 600 may be one or more, and FIG. 6 uses one processor as an example). In some embodiments of the present invention, the input apparatus 601, the output apparatus 602, the processor 603, and the memory 604 may be connected by using a bus or in another manner. A connection by using the bus is used as an example in FIG. 6.

The processor 603 is configured to perform the information transmission method implemented on a side of the foregoing base station. The processor 603 is configured to perform the following steps:

receiving a random access preamble sent by user equipment UE;

generating first information according to the received random access preamble, where the first information is information about a random access response to the random access preamble, and the first information includes at least one of the following information: timing advance indication information, indication information of a narrowband resource used for transmission of a control channel, indication information of a subframe used for transmission of the control channel, indication information of a demodulation reference signal scrambling sequence initialization parameter used for transmission of the control channel, indication information of a coverage enhancement level used for transmission of the control channel, or resource allocation information used for transmission of second information, where the second information is information about a response to the first information; and sending the first information to the UE.

In some embodiments of the present invention, the first information further includes at least one of the following information: indication information of a temporary cell-radio network temporary identifier, indication information of the random access preamble, rollback indication information, or indication information of a control channel candidate set of the control channel.

In some embodiments of the present invention, the first information further includes at least one of the following information: frequency hopping indication information of the second information, coverage enhancement transmission indication information of the second information, start offset indication information of a physical uplink control channel resource, or frequency hopping indication information of the control channel.

In some embodiments of the present invention, the first information further includes at least one of the following information: transmit power control indication information used by the UE to send the second information, modulation and coding method indication information used by the UE to send the second information, uplink delay indication information used by the UE to send the second information, indication information indicating whether the UE reports channel state information, start symbol indication information for transmission of a UE-specific message, control channel configuration set identifier indication information of the control channel, or indication information of a transmission type used for transmission of the control channel.

In some embodiments of the present invention, the first information further includes: format indication information of the downlink control channel, or format indication information of the downlink data channel.

In some embodiments of the present invention, the processor 603 is specifically configured to perform the following steps:

adding the first information to the downlink control channel, and sending the first information to the UE by using the downlink control channel; or adding the first information to the downlink data channel, and sending the first information to the UE by using the downlink data channel.

In some embodiments of the present invention, the processor 603 is further configured to perform the following step:

before sending the first information to the UE, scrambling the first information according to the radio network temporary identifier, where the radio network temporary identifier is determined according to the random access preamble.

In some embodiments of the present invention, the processor 603 is further configured to perform the following step: after sending the first information to the UE, scrambling or descrambling at least one of the second information, the control channel, or the UE-specific information according to the radio network temporary identifier, where the radio network temporary identifier is determined according to the random access preamble.

It can be learned from the description of the present invention in the foregoing embodiment that, first, the random access preamble sent by the UE is received, and then the first information is generated according to the received random access preamble. The first information is the information about the random access response to the random access preamble, and the first information includes at least one of the following information: the timing advance indication information, the indication information of the narrowband resource used for transmission of the control channel, the indication information of the subframe used for transmission of the control channel, the indication information of the demodulation reference signal scrambling sequence initialization parameter used for transmission of the control channel, the indication information of the coverage enhancement level used for transmission of the control channel, or the resource allocation information used for transmission of the second information. The second information is the information about the response to the first information. Finally, the first information is sent to the UE. The first information is information about a random access response, and the foregoing indication information included in the first information has fewer indicator bits. Therefore, the first information has a more simplified structure, so that access response information can be transmitted by using relatively fewer resources, thereby improving resource utilization efficiency in transmission of information about a random access response, and reducing power consumption overheads of channel detection by user equipment.

Figure 7:
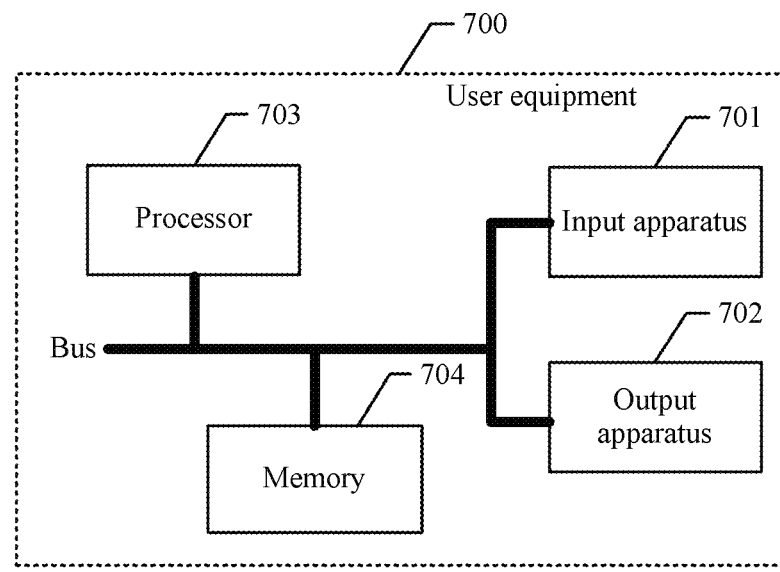
FIG. 7 is a schematic structural composition diagram of another user equipment according to an embodiment of the present invention.

The following describes another user equipment provided by an embodiment of the present invention. Referring to FIG. 7, the user equipment 700 includes:

an input apparatus 701, an output apparatus 702, a processor 703, and a memory 704 (a quantity of processors 703 in the user equipment 700 may be one or more, and FIG. 7 uses one processor as an example). In some embodiments of the present invention, the input apparatus 701, the output apparatus 702, the processor 703, and the memory 704 may be connected by using a bus or in another manner. A connection by using the bus is used as an example in FIG. 7.

The processor 703 is configured to perform the information transmission method implemented on a side of the foregoing user equipment. The processor 703 is configured to perform the following steps:

sending a random access preamble to a base station;

receiving first information corresponding to the random access preamble, where the first information is information about a random access response of the base station to the random access preamble; and obtaining at least one of the following information from the first information: timing advance indication information, indication information of a narrowband resource used for transmission of a control channel, indication information of a subframe used for transmission of the control channel, indication information of a demodulation reference signal scrambling sequence initialization parameter used for transmission of the control channel, indication information of a coverage enhancement level used for transmission of the control channel, or resource allocation information used for transmission of second information, where the second information is information about a response to the first information.

In some embodiments of the present invention, the first information further includes at least one of the following information: indication information of a temporary cell-radio network temporary identifier, indication information of the random access preamble, rollback indication information, or indication information of a control channel candidate set of the control channel.

In some embodiments of the present invention, the first information further includes at least one of the following information: frequency hopping indication information of the second information, coverage enhancement transmission indication information of the second information, start offset indication information of a physical uplink control channel resource, or frequency hopping indication information of the control channel.

In some embodiments of the present invention, the first information further includes at least one of the following information: transmit power control indication information used by the UE to send the second information, modulation and coding method indication information used by the UE to send the second information, uplink delay indication information used by the UE to send the second information, indication information indicating whether the UE reports channel state information, start symbol indication information for transmission of a UE-specific message, control channel configuration set identifier indication information of the control channel, or indication information of a transmission type used for transmission of the control channel.

In some embodiments of the present invention, the first information further includes: format indication information of the downlink control channel, or format indication information of the downlink data channel.

In some embodiments of the present invention, the processor 703 is specifically configured to perform the following steps:

receiving the downlink control channel, and obtaining the first information from the downlink control channel; or receiving the downlink data channel, and obtaining the first information from the downlink data channel.

In some embodiments of the present invention, the processor 703 is further configured to perform the following step:

descrambling the first information according to the radio network temporary identifier, where the radio network temporary identifier is determined according to the random access preamble.

In some embodiments of the present invention, the processor 703 is further configured to perform the following step:

after receiving the first information corresponding to the random access preamble, performing at least one of the following steps: sending the second information, receiving the control information, or receiving the UE-specific information; and scrambling or descrambling at least one of the second information, the control channel, or the UE-specific information according to the radio network temporary identifier, where the radio network temporary identifier is determined according to the random access preamble.

It can be learned from the description of the present invention in the foregoing embodiment that, first, the UE sends the random access preamble, and then the UE receives the first information corresponding to the random access preamble. The first information is the information about the random access response to the random access preamble. The first information includes at least one of the following information: the timing advance indication information, the indication information of the narrowband resource used for transmission of the control channel, the indication information of the subframe used for transmission of the control channel, the indication information of the demodulation reference signal scrambling sequence initialization parameter used for transmission of the control channel, the indication information of the coverage enhancement level used for transmission of the control channel, or the resource allocation information used for transmission of the second information. The second information is the information about the response to the first information. Finally, the first information is sent to the UE. The first information is information about a random access response, and the foregoing indication information included in the first information has fewer indicator bits. Therefore, the first information has a more simplified structure, so that access response information can be transmitted by using relatively fewer resources, thereby improving resource utilization efficiency in transmission of information about a random access response, and reducing power consumption overheads of channel detection by user equipment.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. Persons of ordinary skill in the art may understand and implement the embodiments of the present invention without creative efforts.

Based on the description of the foregoing implementations, persons skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation in most cases. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present invention.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method implemented by a base station, the method comprising:
receiving a random access preamble from a user equipment (UE);
generating first information according to the random access preamble, the first information is random access response information, and the first information further comprising one or more of:
narrowband indication information used for transmission of a control channel, or resource allocation information used for transmission of second information; the second information is response information to the first information, and the resource allocation information indicating the narrowband and resource allocation within a narrowband, the narrowband including six physical resource blocks (PRBs), and 3 bits indicating the resource allocation within the narrowband as illustrated in the following table:

| Resource indication bit status within the narrowband | Resource within the narrowband |
| --- | --- |
| 000 | PRB n |
| 001 | PRB n + 1 |
| 010 | PRB n + 2 |
| 011 | PRB n + 3 |
| 100 | PRB n + 4 |
| 101 | PRB n + 5 |
| 110 | PRB n, PRB n + 1 |
| 111 | PRB n + 2, PRB n + 3; | and
sending the first information to the UE.

2. The method of claim 1, wherein the first information further comprises one or more of temporary cell-radio network temporary identifier indication information, random access preamble indication information, rollback indication information, or control channel candidate set indication information of the control channel.

3. The method of claim 1, wherein the first information further comprises one or more of frequency hopping indication information of the second information, coverage enhancement transmission indication information of the second information, start offset indication information of a physical uplink control channel resource, or frequency hopping indication information of the control channel.

4. The method of claim 1, wherein the first information further comprises one or more of transmit power control indication information used by the UE to send the second information, modulation and coding method indication information used by the UE to send the second information, uplink delay indication information used by the UE to send the second information, UE report indication information indicating whether the UE reports channel state information, start symbol indication information for transmission of a UE-specific message, control channel configuration set identifier indication information of the control channel, or transmission type indication information used for transmission of the control channel.

5. The method of claim 1, wherein the first information further comprises one or more of downlink control channel format indication information or downlink data channel format indication information.

6. The method of claim 5, wherein the method further comprises sending the first information by the downlink control channel or the downlink data channel.

7. A non-transitory computer-readable storage medium comprising instructions which, when executed by a processor, cause the processor to:
send a random access preamble to a base station; and
receive first information corresponding to the random access preamble, the first information is random access response information, the first information further comprising one or more of:
narrowband indication information used for transmission of a control channel, or resource allocation information used for transmission of second information; the second information is response information to the first information, and the resource allocation information indicating the narrowband and resource allocation within a narrowband, the narrowband including six physical resource blocks (PRBs), and 3 bits indicating the resource allocation within the narrowband as illustrated in the following table:

| Resource indication bit status within the narrowband | Resource within the narrowband |
|---|---|
| 000 | PRB n |
| 001 | PRB n + 1 |
| 010 | PRB n + 2 |
| 011 | PRB n + 3 |
| 100 | PRB n + 4 |
| 101 | PRB n + 5 |
| 110 | PRB n, PRB n + 1 |
| 111 | PRB n + 2, PRB n + 3. |

8. The medium of claim 7, wherein the first information further comprises one or more of temporary cell-radio network temporary identifier indication information, random access preamble indication information, rollback indication information, or control channel candidate set indication information of the control channel.

9. The medium of claim 7, wherein the first information further comprises one or more of frequency hopping indication information of the second information, coverage enhancement transmission indication information of the second information, start offset indication information of a physical uplink control channel resource, or frequency hopping indication information of the control channel.

10. The medium of claim 7, wherein the first information further comprises one or more of transmit power control indication information used by the UE to send the second information, modulation and coding method indication information used by the UE to send the second information, uplink delay indication information used by the UE to send the second information, UE report indication information indicating whether the UE reports channel state information, start symbol indication information for transmission of a UE-specific message, control channel configuration set identifier indication information of the control channel, or transmission type indication information used for transmission of the control channel.

11. The medium of claim 7, wherein the first information further comprises one or more of downlink control channel format indication information or downlink data channel format indication information.

12. The medium of claim 11, wherein the instructions further cause the processor to receive the first information by the downlink control channel or the downlink data channel.

13. The medium of claim 7, wherein the instructions further cause the processor to scramble the first information according to a radio network temporary identifier, wherein the radio network temporary identifier is determined according to the random access preamble.

14. A non-transitory computer-readable storage medium comprising instructions which, when executed by a processor, cause the processor to:
receive a random access preamble from a user equipment (UE);
generate first information according to the random access preamble, the first information is random access response information, the first information further comprising one or more of:
narrowband indication information used for transmission of a control channel, or resource allocation information used for transmission of second information; the second information is response information to the first information, and the resource allocation information indicating the narrowband and resource allocation within a narrowband, the narrowband including six physical resource blocks (PRBs), and 3 bits indicating the resource allocation within the narrowband as illustrated in the following table:

| Resource indication bit status within the narrowband | Resource within the narrowband |
|---|---|
| 000 | PRB n |
| 001 | PRB n + 1 |
| 010 | PRB n + 2 |
| 011 | PRB n + 3 |
| 100 | PRB n + 4 |
| 101 | PRB n + 5 |
| 110 | PRB n, PRB n + 1 |
| 111 | PRB n + 2, PRB n + 3; | and
send the first information to the UE.

15. The medium of claim 14, wherein the first information further comprises one or more of temporary cell-radio network temporary identifier indication information, random access preamble indication information, rollback indication information, or control channel candidate set indication information of the control channel.

16. The medium of claim 14, wherein the first information further comprises one or more of frequency hopping indication information of the second information, coverage enhancement transmission indication information of the second information, start offset indication information of a physical uplink control channel resource, or frequency hopping indication information of the control channel.

17. The medium of claim 14, wherein the first information further comprises one or more of transmit power control indication information used by the UE to send the second information, modulation and coding method indication information used by the UE to send the second information, uplink delay indication information used by the UE to send the second information, UE report indication information indicating whether the UE reports channel state information, start symbol indication information for transmission of a UE-specific message, control channel configuration set identifier indication information of the control channel, or transmission type indication information used for transmission of the control channel.

18. The medium of claim 14, wherein the first information further comprises one or more of downlink control channel format indication information or downlink data channel format indication information.

19. The medium of claim 18, wherein the instructions further cause the processor to send the first information by the downlink control channel or the downlink data channel.

20. The medium of claim 14, wherein the instructions further cause the processor to descramble the first information according to a radio network temporary identifier, wherein the radio network temporary identifier is determined according to the random access preamble.

* * * * *